United States Patent [19]
Nagoshi et al.

[11] Patent Number: 6,033,055
[45] Date of Patent: *Mar. 7, 2000

[54] INK JET RECORDING APPARATUS AND INK JET RECORDING METHOD

[75] Inventors: Shigeyasu Nagoshi, Kawasaki; Hiromitsu Hirabayashi, Yokohama; Kiichiro Takahashi, Kawasaki; Osamu Iwasaki, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/159,126

[22] Filed: Nov. 30, 1993

[30] Foreign Application Priority Data

Dec. 4, 1992 [JP] Japan .................................. 4-325560

[51] Int. Cl.⁷ .............................. B41J 2/21; B41J 29/38
[52] U.S. Cl. ................................................ 347/43; 347/9
[58] Field of Search .................................. 347/43, 40, 9, 347/15, 3

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,593,295 | 6/1986 | Matsufuji et al. | 347/43 X |
| 4,723,129 | 2/1988 | Endo et al. | 346/1.1 |
| 4,740,796 | 4/1988 | Endo et al. | 346/1.1 |
| 4,748,453 | 5/1988 | Lin et al. | 346/1.1 |
| 4,965,593 | 10/1990 | Hickman | 347/41 X |
| 4,967,203 | 10/1990 | Doan et al. | 346/1.1 |
| 5,012,257 | 4/1991 | Lowe et al. | 347/43 |
| 5,373,368 | 12/1994 | Taniguro | 347/3 |
| 5,650,808 | 7/1997 | Vincent et al. | 347/43 |

FOREIGN PATENT DOCUMENTS

| | | |
|---|---|---|
| 0382023 | 8/1990 | European Pat. Off. . |
| 0430451 | 6/1991 | European Pat. Off. . |
| 0440458 | 8/1991 | European Pat. Off. . |
| 54-56847 | 5/1979 | Japan . |
| 59-123670 | 7/1984 | Japan . |
| 59-138461 | 8/1984 | Japan . |
| 60-71260 | 4/1985 | Japan . |
| 60-107975 | 6/1985 | Japan . |
| 1-216852 | 8/1989 | Japan .................. B41J 3/04 |
| 3-189167 | 8/1991 | Japan .................. B41J 2/21 |
| 531922 | 2/1993 | Japan ........................ 347/9 |
| 6-127032 | 5/1994 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

An ink jet recording apparatus performs the recording, using a recording head for discharging the ink onto the recording medium to effect the recording, while moving said recording head in a main scan direction. The recording head has a plurality of discharge orifice groups in the main scan direction, each of which has a plurality of discharge orifices for discharging the inks of different colors provided in a direction different from the main scan direction.

22 Claims, 24 Drawing Sheets

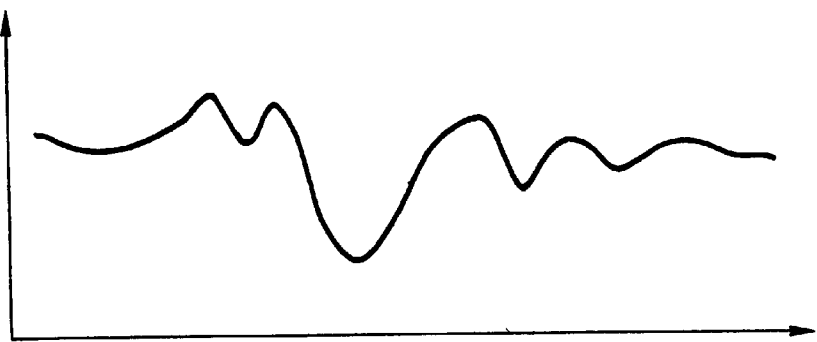
FIG. 13C PRIOR ART
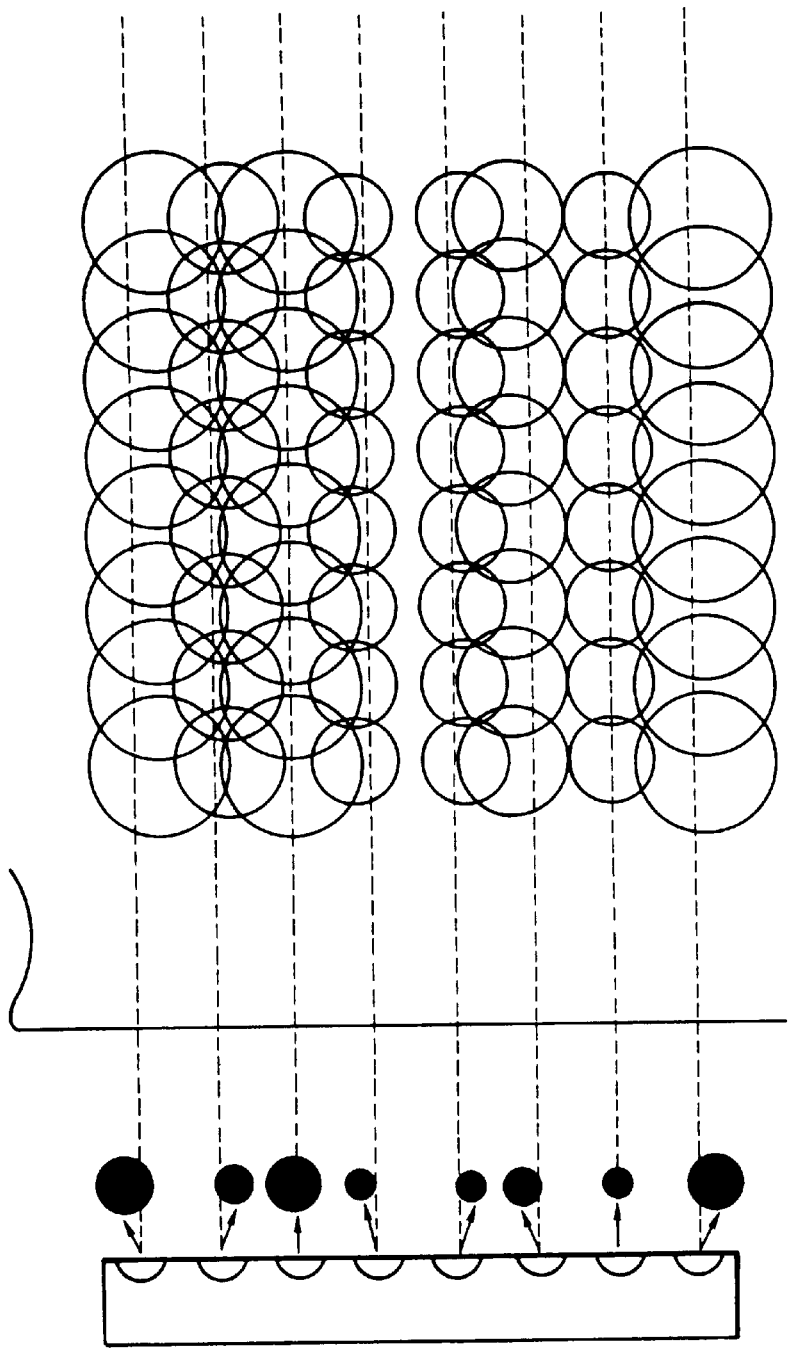
FIG. 13B PRIOR ART
FIG. 13A PRIOR ART

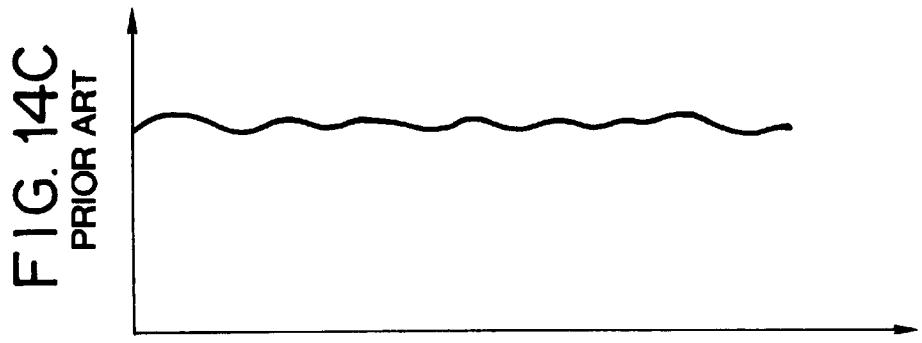
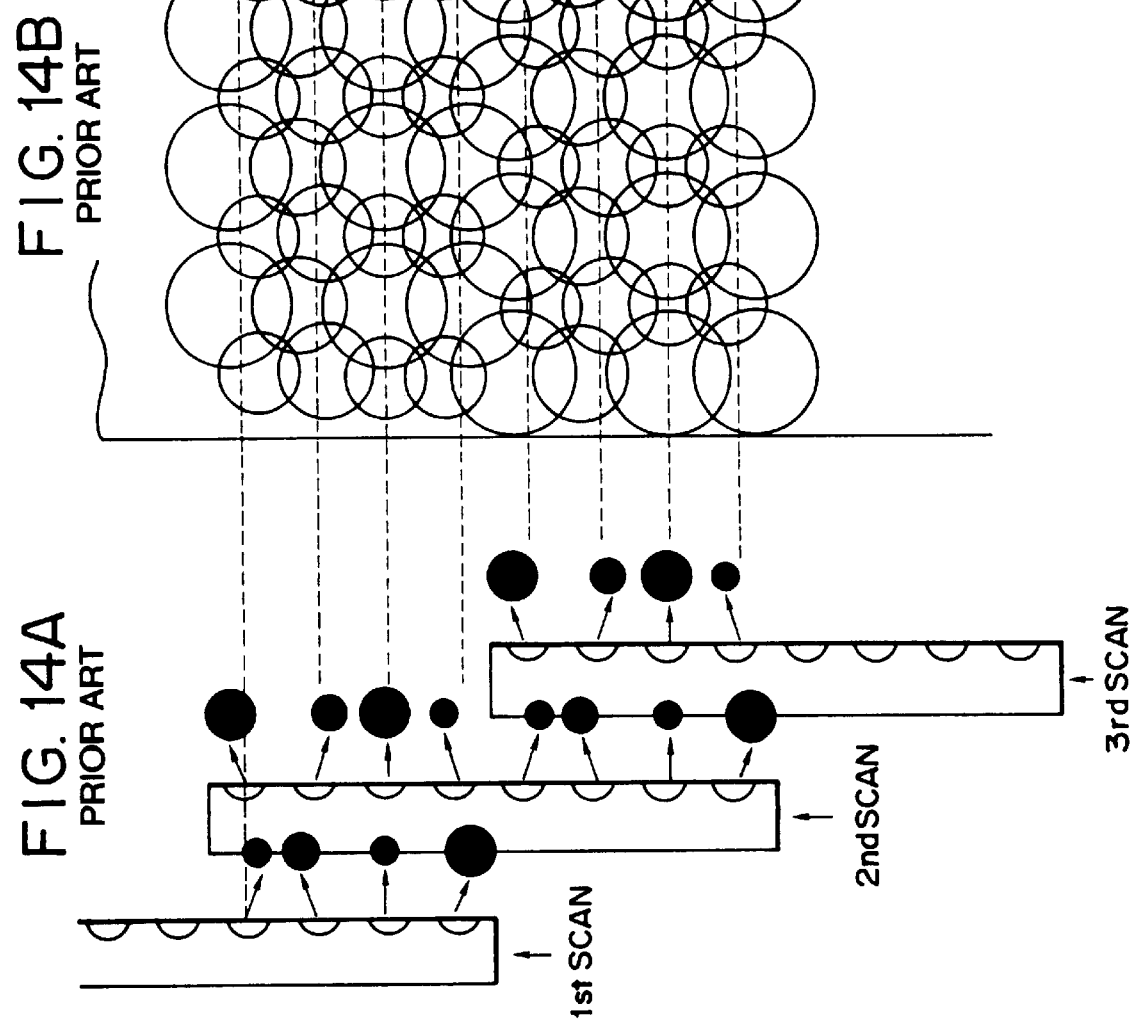
FIG. 14C PRIOR ART
FIG. 14B PRIOR ART
FIG. 14A PRIOR ART
1st SCAN
2nd SCAN
3rd SCAN

CROSS PATTERN

COUNTER-CROSS PATTERN

INK JET RECORDING APPARATUS AND INK JET RECORDING METHOD

BACKGROUND OF THE INVENTION

1. Field of the Invention

The present invention relates to an ink jet recording apparatus, an ink jet recording head and an ink jet recording method of the serial type in which the image quality and the throughput are improved.

2. Related Background Art

The arts examined by the present inventors to achieve this invention will be described below. (Color-specific heads arranged in scan direction)

FIG. 11 shows a conventional ink jet color printer of the serial type. A print head 1 has a plurality of nozzle columns, and is a device for recording an image on the recording medium by discharging ink droplets to form dots thereon. Different color inks are discharged through different print heads, and by the color mixture of such ink droplets, a color image is formed on the recording medium.

Print data is transmitted via a cable 9 from an electric circuit of a printer itself to print heads. A row of print heads 1K (black), 1C (cyan), 1M (magenta) and 1Y (yellow) are mounted on a carriage 201 to discharge the inks in this order during one scan. For example, when red (R) is formed, magenta (M) ink is first shot onto the recording medium, and then yellow (Y) ink is shot onto a dot of M, so that a dot of red appears.

Similarly, when green (G) is formed, C and Y are shot in this order, and when blue (B) is formed, C and M are shot in this order. However, for example, when G is printed in solid, C is printed, then carriage is caused to scan by the distance of 2×P1, and Y is then printed, since print heads are spaced at a certain interval (P1). That is, solid Y is printed on solid C.

This carriage 201 is controlled for movement in a main scan direction by a speed sensing means 5 which senses the scanning speed of carriage and the print position. The power source for this purpose is a carriage drive motor 8, the power of which is transmitted by belts 6, 7 for the sliding movement along a shaft. During the movement in the main scan direction, the printing in a column direction is performed. There are two kinds of print operations in the column direction; one-way printing and two-way printing. Normally, the one-way printing is performed only when carriage is moved in a direction away from a home position (forward direction), but not when carriage is returned to the home position (backward direction). That is, high precision printing is allowed. The term herein used "home position" (hereinafter abbreviated as HP) refers to a position at which carriage 201 is placed opposite a recovery unit 400.

On the other hand, the two-way printing involves a print operation in both forward and backward directions. Hence, high speed printing is allowed. However, since the shooting order of color inks onto the recording medium will be reversed between the forward and backward printing with the arrangement of print heads of this example, the color tint of mixed colors may be different for each scan. In the case of G, it is printed in the order of C and Y in the forward printing, but it is printed in the reverse order of Y and C in the backward printing, resulting in green of a yellow tint, as compared with the printing in the order of C and Y. In this way, normally, the two-way color printing is not allowed due to the occurrence of differences in color tint, and thus can be performed only in the case of monochrome printing. Recovery unit 400 has a function of retaining the state of print heads excellent at all times, wherein in the non-print state, a row of caps enclose the discharge face of print heads to prevent drying.

The function of the recovery unit during the print operation will be described below. In the actual print operation, all the nozzles within one head are not necessarily used. Also, despite plural color print heads provided, some heads may be unused to which print data is not transferred. In this way, if any ink is not discharged successively for a certain period of time (with the print head not capped) during the scanning of carriage, it is apprehended that the discharge performance of ink may decrease due to fixing or drying of the ink on the surface of print head, resulting in a degraded image. To prevent this phenomenon, the print head is forced to discharge the ink through the nozzles within the head at certain intervals, rather than printing data, to hold the state on the surface of print head optimum at any time. This operation is referred to as predischarge.

The ink discharged by this predischarge is directed into caps 420 within the recovery unit 400, and sucked by a recovery pump, not shown, to be stored in a waste ink tank, so that the ink may not splash over the recording medium or inside the printer to produce contamination. Hence, when predischarge is performed during the print operation, it is necessary, in either of the one-way and two-way printing, that carriage 201 returns to HP and placed opposite the row of caps 420. The feeding of recording medium in the sub-scan direction is effected by a sheet feed member (e.g., rubber roller) driven by a sheet feed motor, not shown. A sheet is supplied from a direction of the arrow A as shown in the same figure, and if the sheet arrives at the print position, the print operation is performed by the row of print heads. Thereafter, the sheet is exhausted in a direction of the arrow B by means of sheet exhaust mechanisms 2, 3. Also, the supply of ink is performed from an ink cassette 10K, 10C, 10M, 10Y to a print head for each color.

(Fine recording)

Unlike printing only the character as the monochrome printer, the printing of color image requires various factors such as coloration, gradation and uniformity. In particular, regarding the uniformity, a slight dispersion of each nozzle yielded during the manufacturing process of print head may affect the amount or direction of discharging the ink from each nozzle, in printing, finally causing density unevenness in the printed image and resulting in a degraded image quality.

A specific example of density unevenness will be described using an example of a monochrome print head, for simplification, with reference to FIGS. 12A to 13C. In FIG. 12A, 91 is a print head, which is comprised of eight multi-nozzles in this case, for simplification. 93 is an ink droplet discharged through a multi-nozzle 92, in which it is usually ideal that the ink is discharged with the equal discharge amount and in the same direction as shown in this figure. If such discharge is performed, dots of equal size will be shot on the sheet, as shown in FIG. 12B, so that a complete image without density unevenness as a whole can be obtained (FIG. 12C).

However, in practice, each of nozzles has a dispersion, as previously described, and if directly printing in the above manner, there will occur some dispersion in the size and direction of an ink droplet discharged from each of the nozzles, as shown in FIG. 13A, so that the ink is shot on the sheet, as shown in FIG. 13B. In this figure, blank portions periodically took place which could not meet the area factor of 100% in the main scan direction of head, or conversely, overlapping dots more than necessary, or white streaks as seen in the central part of the figure took place. A set of dots shot in such a state has a density distribution as shown in FIG. 13C in a direction of nozzle column, with the result that such a phenomenon can be normally sensed as a density unevenness simply by seeing with the human eyes. Also, conspicuous streaks may be caused by the dispersion in the sheet feed amount. Thus, a measure against density unevenness or tie streaks for the monochrome ink jet recording apparatuses has been devised in Japanese Laid-Open Patent Application No. 60-107975. This measure will be described briefly with reference to FIGS. 14A to 15C. With this measure, the print head 91 is scanned by three times to complete a print area as shown in FIGS. 12A to 13C, but the one-half area in units of four pixels is completed by two passes (main scan by two times). In this case, the print head of eight nozzles is divided into the upper part of four nozzles and the lower part of four nozzles, wherein dots which one nozzle prints by one time of scan are thinned out to about one-half thereof in accordance with a predetermined array of image data. And with the second scan, remaining image data is embedded with dots to complete the print for the area in units of four pixels. The manner of recording as above described is referred to as a fine recording mode.

With this recording method, the influence inherent to each nozzle on printed image can be reduced even by using a print head identical to that as shown in FIGS. 13A to 13C, resulting in a printed image as shown in FIG. 14B without conspicuous black or white streaks as seen in FIGS. 13A to 13C. Accordingly, density unevenness can be relieved appreciably as shown in FIG. 14C, as compared with that as shown in FIGS. 13A to 13C. In such recording, the image data is divided between the first and second scans to make up for each other in a predetermined array, wherein this image data array (thinning pattern) is typically a cross lattice where each pixel in longitudinal and horizontal directions is crossed, as shown in FIGS. 15A to 15C.

Accordingly, unit print area (herein, in units of four pixels) is completed by the first scan for printing the cross lattice and the second scan for printing the counter-cross lattice. FIGS. 15A, 15B and 15C are views for explaining how the printing for a certain area is formed in such cross and counter-cross patterns, using a print head of eight nozzles, as in FIGS. 12A to 14C. First, at the first scan, the cross pattern is printed using the lower four nozzles (FIG. 15A). Next, at the second scan, the counter-cross pattern is printed after feeding the sheet by the amount of four pixels (one-half all the nozzles) (FIG. 15B). Further, at the third scan, the cross pattern is printed again after feeding the sheet by the amount of four pixels as well (one-half all the nozzles) (FIG. 15C).

In this manner, the print area in units of four pixels is completed for every scan in such a manner as to feed the sheet by the amount of four pixels and alternately perform of the printing of the cross or counter-cross pattern. As described above, a high quality image without density unevenness can be obtained by completing the printing on the same area with different types of nozzles.

<Color-sequential heads arranged in sub-scan direction>

Apart from the print head arranged in the main scan direction, as previously described, there is a print head 301 arranged for each color in a recording medium conveying direction (sub-scan direction). As shown in FIG. 16, an ink discharge portion for each color is arranged along the recording medium conveying direction. One or more ink discharge orifices are arranged in the ink discharge portion for each color. In this figure, the color image forming sequence is K, C, M and Y, but practically, another sequence, for example, Y, M, C, K, may be possible for the print head. The way of forming an image wherein a print head for each color is separately arranged in the recording medium conveying direction, or the sequence of forming the color, is shown in FIG. 17.

The same figure shows the color mixture of K and C, wherein print head 301 forms an image in such a manner as to feed one line for each scan. As will be clear from the figure, K ink is first shot at all times, and then C ink is shot, whereby there occurs no difference in the color tint produced by the change in the order of shooting onto the recording medium. Each scan of the same figure is consistent for both the one-way and two-way printing. In this way, since each color ink is shot onto the recording medium in the same sequence, the two-way printing is allowed, unlike the color-specific head arranged in the main scan direction as previously described, so that the high speed printing can be implemented. To effect the fine printing with this method, the width of line feed is set to be shorter than the width of print head for each color. A pixel is not formed by the same nozzle in the raster direction but formed by using different nozzles with the line feed. FIG. 18 shows an instance wherein the width of line feed is one-half that of print head for each color. As shown in the same figure, the reciprocative printing is possible, but the formation of one line of color image requires the scanning of print head to be performed by eleven times.

However, in the case of the color-specific head arranged in the main scan direction, as previously described, there was a problem that the reciprocative color printing was usually impossible, so that the time required to output the color image was significantly larger. Also, in the case of the color-sequential head arranged in the sub-scan direction, there was a problem that the reciprocative color printing was possible, with the improved throughput attained, but to effect the fine printing mode capable of outputting the higher quality image, a greater number of times of scanning were required corresponding to the number of print heads arranged longitudinally.

SUMMARY OF THE INVENTION

The present invention has been achieved in view of the aforementioned problems, and its object is to provide an ink jet recording apparatus, an ink jet recording head and an ink jet recording method with the improved image quality and throughput.

It is another object of the present invention to provide an ink jet recording apparatus which performs the recording, using a recording head for discharging the ink onto the recording medium to make the recording, while moving the recording head in a main scan direction, characterized in that said recording head has a plurality of discharge orifice groups in the main scan direction, each of which has a plurality of discharge orifices for discharging the inks of different colors which are provided in a direction different from the main scan direction.

It is a further object of the present invention to provide an ink jet recording head for use with an ink jet recording apparatus which performs the recording while moving the recording head in a main scan direction, the ink jet recording head discharging the ink onto the recording medium to make the recording, characterized by comprising a plurality of discharge orifice groups in the main scan direction, each of which has a plurality of discharge orifices for discharging the inks of different colors which are provided in a direction different from the main scan direction, when mounted on the ink jet recording apparatus.

It is a still further object of the present invention to provide an ink jet recording head for use with an ink jet recording apparatus which performs the recording while moving a recording head in a main scan direction, the ink jet recording head discharging the ink onto the recording medium to make the recording, characterized by including providing the ink jet recording head having a plurality of discharge orifice groups in the main scan direction, each of which has a plurality of discharge orifices for discharging the inks of different colors which are provided in a direction different from the main scan direction, when mounted on the ink jet recording apparatus, and performing the recording by discharging the ink onto the recording medium from the ink jet recording head, with the ink jet recording head mounted on the ink jet recording apparatus.

This invention also involves an ink jet recording apparatus for recording on a recording medium in plural colors. The apparatus includes ink jet recording heads provided along a main scan direction, each of which ink jet heads records on the recording medium by discharging ink through a discharge port and has discharge port groups having discharge ports arranged along a direction different from the main scan direction. The discharge port groups of a predetermined recording head correspond to the plural colors and the discharge port groups corresponding to ink of a same color are arranged on the ink jet recording heads. A scanning means reciprocally scans the ink jet recording heads along the main scan direction and a recording control means controls scanning of the ink jet recording heads by the scanning means relative to the recording medium to record by discharging ink through the discharge ports. The recording control means, for the groups of discharge ports which correspond to the ink of the same color and have different positions along the main scan direction, differentiates at least one of a given position where the discharge port groups discharge ink to record and a scanning direction by the scanning means when the discharge port groups record.

According to the present invention, the printing is performed by means of a recording head having a plurality of discharge orifice groups, each of which has a plurality of discharge orifices for discharging the inks of different colors which are provided in a direction different from the main scan direction, resulting in a higher quality image owing to the combination of the color-sequential head and the fine recording mode, with less print unevenness, at the higher speed of printing due to reciprocative printing.

BRIEF DESCRIPTION OF THE DRAWINGS

FIGS. 13A to 13C are views showing the fine recording method.

FIGS. 14A to 14C are views showing the fine recording method.

DETAILED DESCRIPTION OF THE PREFERRED EMBODIMENTS (First embodiment)

Figure 1:
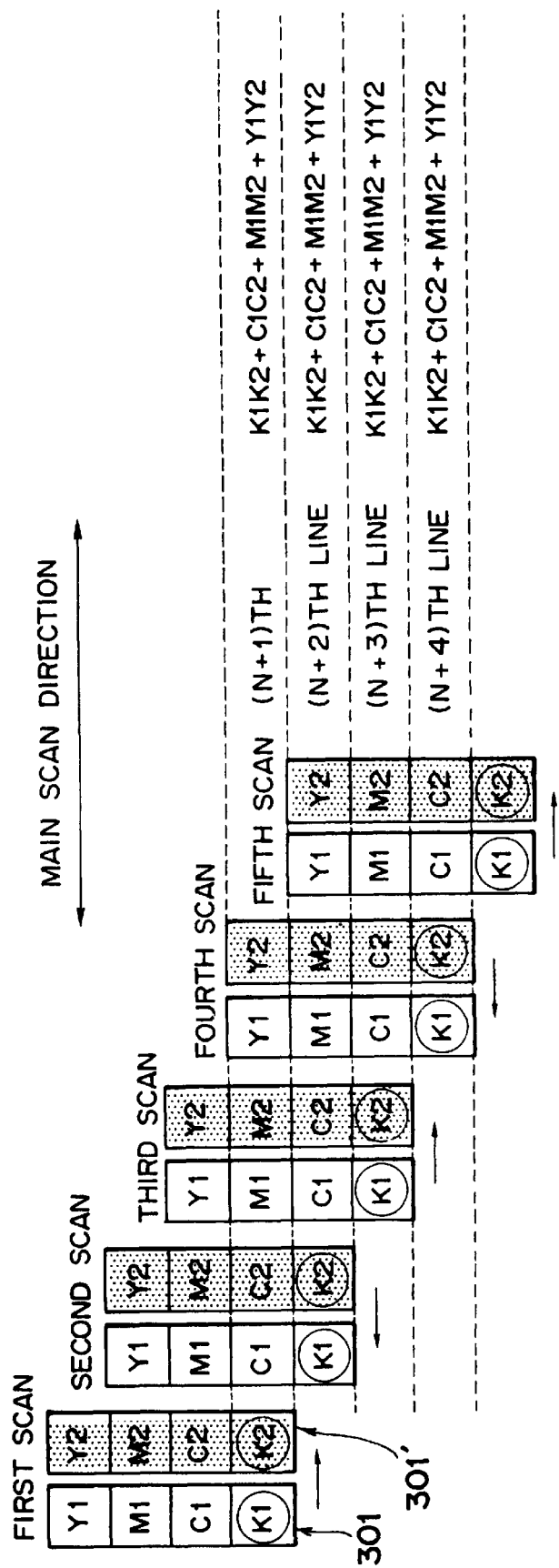
FIG. 1 is a view showing the print head arrangement according to the first embodiment.

A first embodiment is shown in FIG. 1, wherein the same parts as in the conventional example are indicated by the same symbols. In this embodiment, another group of print heads 301 is arranged in a main scan direction. The forward scan is made at the scan of add times, and the backward scan is made at the scan of even times. A predetermined image data is divided by a suitable image data supply means into thinned image data which is in complementary relation to each other, each of the thinned image data being supplied to a different discharge orifice group, so that the predetermined image data can be recorded using different discharge orifice groups.

Figure 2A:
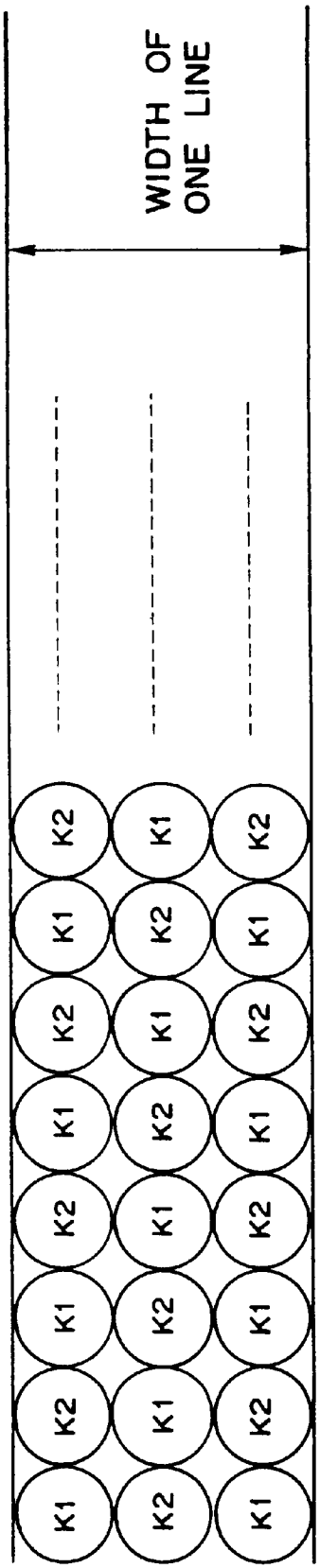
FIGS. 2A and 2B are views showing the dot arrangement in the first embodiment.
Figure 2B:
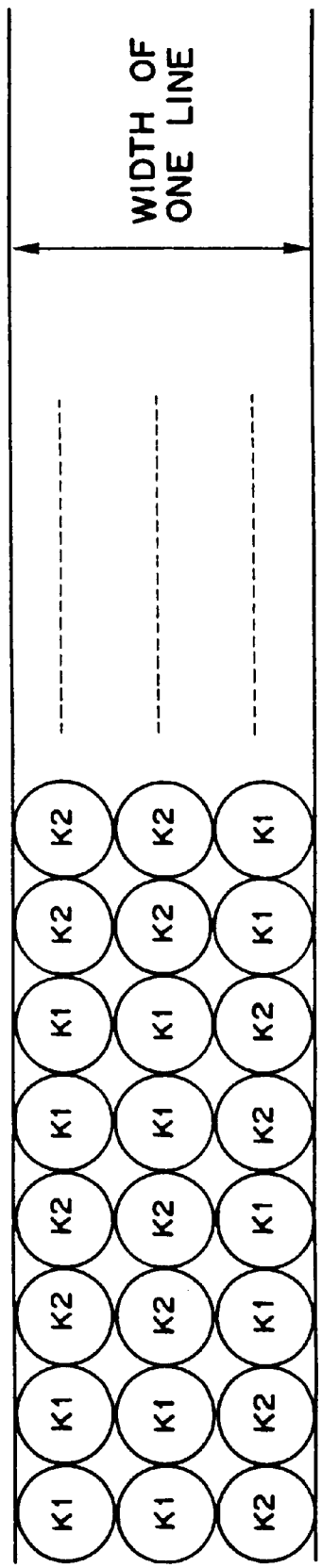

At the first scan, the printing is performed on the N+1-th line by means of K1 and K2 of the heads 301, 301'. At this time, if K1 and K2 are caused to shoot ink droplets on the same raster in complementary relation to each other, owing to the thinning printing, it is possible to form an excellent image without any deviation or unevenness which may be caused by the use of the same head, like the fine recording mode as previously described. FIGS. 2A and 2B show an example of arranging dots in one line with K1 and K2. For simplification, the dot configuration for one line in the longitudinal direction consists of three dots, but is not limited thereto in practice.

In FIG. 2A, the dots of K1 and K2 are arranged in cross and counter-cross patterns. As in the fine recording mode as previously described, the occurrence of deviation and unevenness with the same head can be prevented. In this embodiment, the line-feed operation to complement the image in the same line is unnecessary, because two groups of print heads are provided. FIG. 2B shows how one print head forms an image using a 2×2 mask. The same figure shows the arrangement in units of four dots. Such dot arrangement may be used depending on the property of the ink or the kind of recording medium. There are identical effects with the fine recording mode as in the conventional example, wherein the high quality image can be output. As above described, with this embodiment, the unevenness and deviation with the head can be prevented owing to the effects with the fine recording mode, and as shown in FIG. 1, four times of scan may be sufficient to form each of colors in one line, resulting in significantly improved throughput.

<Emphasized printing>

In the conventional example, to emphasize a particular color (or to enhance the reflection density), the multiple printing with the same color was made. Normally, to emphasize the black character, K ink was shot twice at the same position on the recording medium. Therefore, the number of scanning the print head was increased, resulting in lower throughput. However, according to this embodiment, there are two print heads arranged, so that if both heads are used at a duty of 100% during one scanning, two dots can be made at the same pixel. As seen in FIG. 1, by printing in the same area without thinning of K1 and K2 at the N+1-th line, the black emphasis can be achieved. The emphasized color is not limited to K, but may be made in any combination of colors, in which no difference in color tint occurs with the reciprocative printing.

<Four-pass printing>

To implement the four-pass printing capable of outputting an image of higher quality, each head may be operated at a duty of 25% at maximum, as shown in FIG. 1. In this case, there are two printing methods of effecting the line feed only after the backward scan but no line feed between the forward scan and the backward scan, and effecting the line feed between the forward and backward scans (the amount of line feed must be halved from that of FIG. 1 in this method). Typically, the latter method can output a higher quality image with less error of conveying the recording medium and inconspicuous unevenness or deviation within the head. In this manner, when the print quality is given a greater priority than the throughput, the use of four-pass printing is allowed. Also, this printing is not limited to four passes, but may be realized in more passes.

<Head construction>

Figure 19:
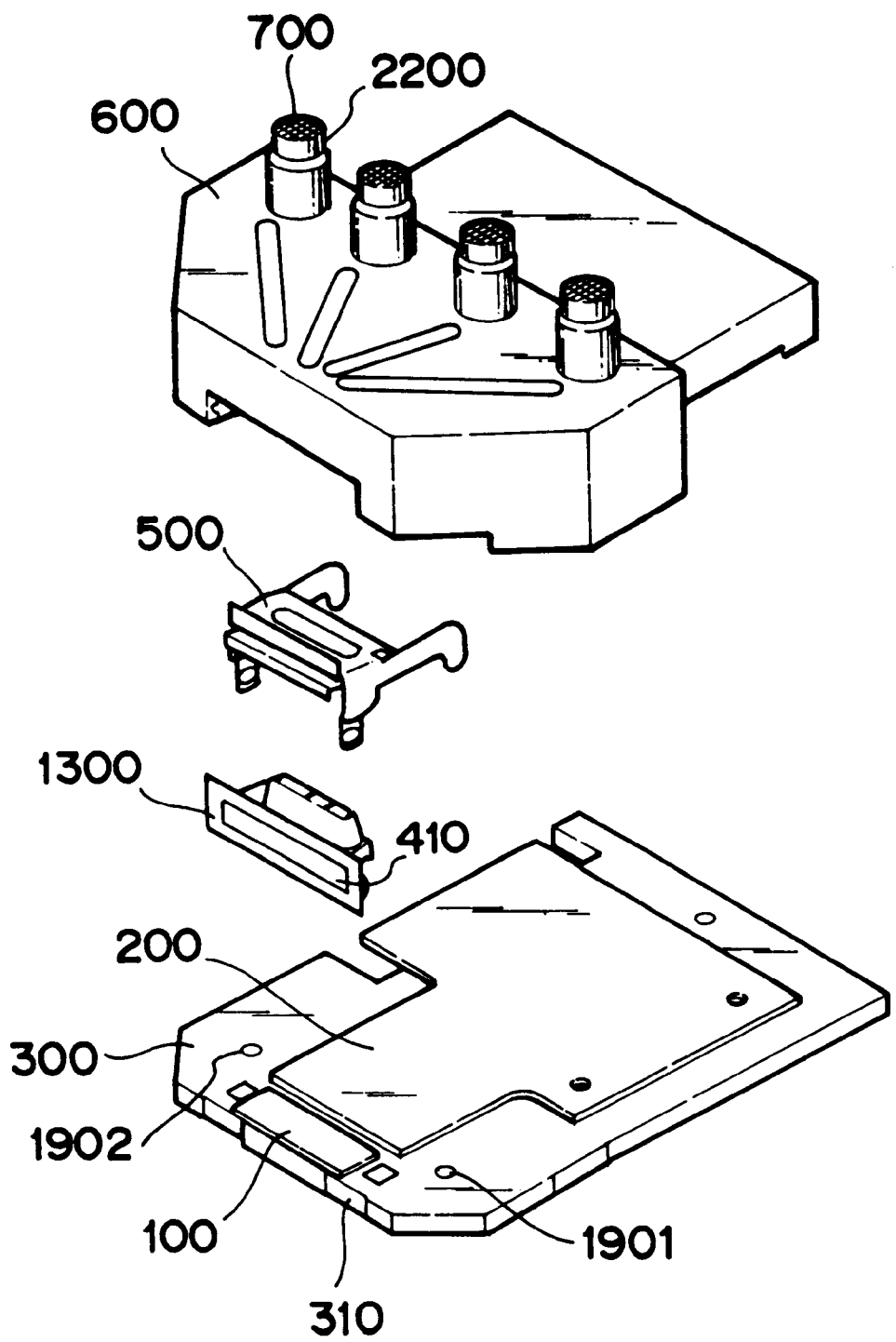
FIG. 19 is a view showing the construction of a head in the embodiment.

FIG. 19 shows the construction of an ink jet head for use in this embodiment. A wiring board 200 is interconnected at its one end to the wiring portion of a heater board 100, and at the other end, provided with a plurality of pads corresponding to electricity-heat energy converters for receiving an electrical signal from the main device. With this wiring board, the electrical signal from the main device is supplied to electricity-heat energy converters.

A carrier 300 made of metal for carrying the back surface of wiring board 200 on the plane thereof serves as a base plate for an ink jet unit. A presser spring 500 has a bent portion shaped like a substantial U-character in cross section to exert a pressing force resiliently along the line on the area of a slotted ceiling 1300 in the neighborhood of an ink discharge orifice, claws for engaging relief holes provided in the base plate, and a pair of back legs for receiving a force exerting on the spring with the base plate.

With this spring force, the wiring board 200 and the slotted ceiling 1300 are placed in close contact with each other. The mounting of the wiring board 200 to the carrier is bonded by means of an adhesive or the like. At the end portion of an ink supply tube 2200 is provided a filter 700.

An ink supply member 600 is molded, and the slotted ceiling is formed with a liquid passageway leading to each ink supply opening. The securing of the ink supply member 600 on to the carrier 300 can be simply made by inserting two pins (not shown) on the back side of the ink supply member 600 into and throughput holes 1901, 1902 of the carrier 300, and thermally fusing them.

In this case, there is a uniform gap formed between an orifice plate 410 and a ink supply member 600. Sealant is poured into an upper sealant inlet port provided in the ink supply member, for sealing wire bondings while at the same time sealing the gap between the orifice plate 410 and the ink supply member 600, further passing through a groove 310 provided on the carrier 300 to seal completely the gap between the orifice plate 410 and the front end portion of the carrier 300.

Figure 20:
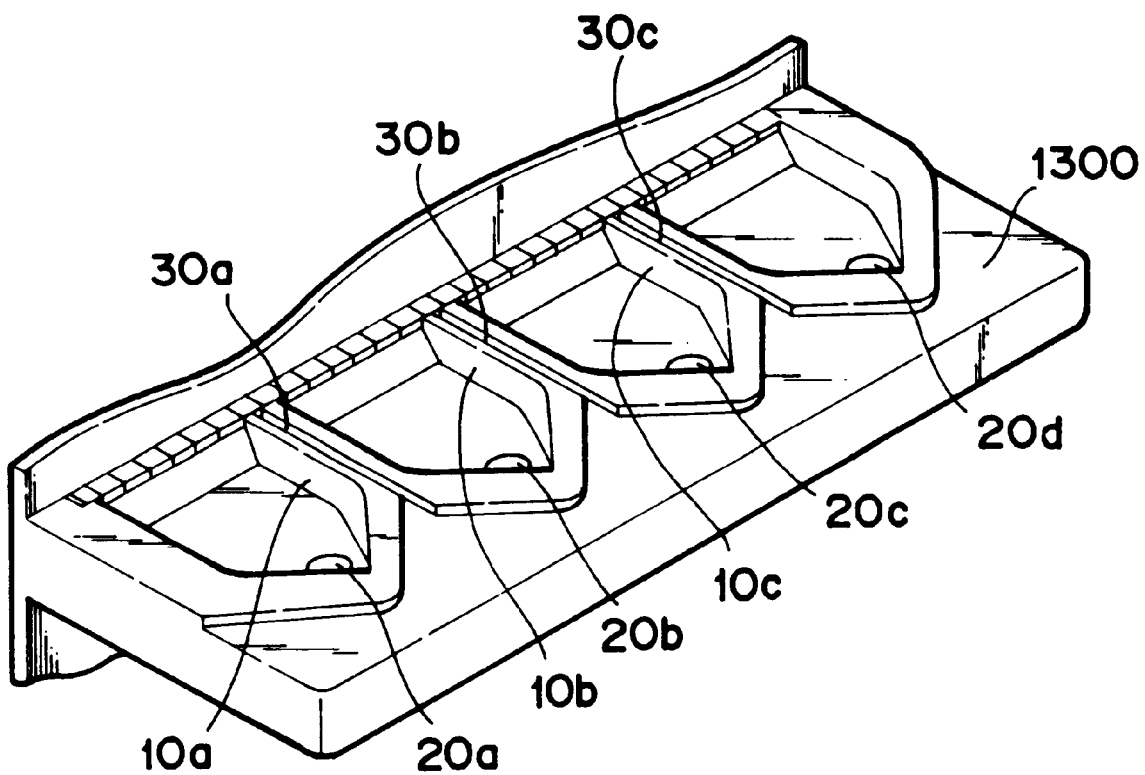
FIG. 20 is a view showing the construction of a liquid chamber in the embodiment.

FIG. 20 is a perspective view of the slotted ceiling 1300 of the head unit for use in this embodiment, as seen from the side of the heater board 100. A plurality of liquid chambers are provided, and partitioned by walls 10a to 10c. Each liquid chamber is provided with a supply port 20a to 20d for supplying the ink to the liquid chamber.

Each of grooves 30a to 30c is provided on the contact face between the partition wall 10a to 10c of liquid chamber and the heater board 100. These grooves are in communication with the external peripheral portion of the slotted ceiling 1300. After the slotted ceiling 1300 is placed under pressure into contact with the heater board, the external peripheral portion is sealed by sealant 120, as above described. In this case, the sealant will permeate to fill the gap between the slotted ceiling and the heater board. In this manner, with conventional technical processes used for the head, liquid chambers can be separated completely. The construction of this groove is different with the material of sealant, and is required to have a shape corresponding thereto.

Figure 21:
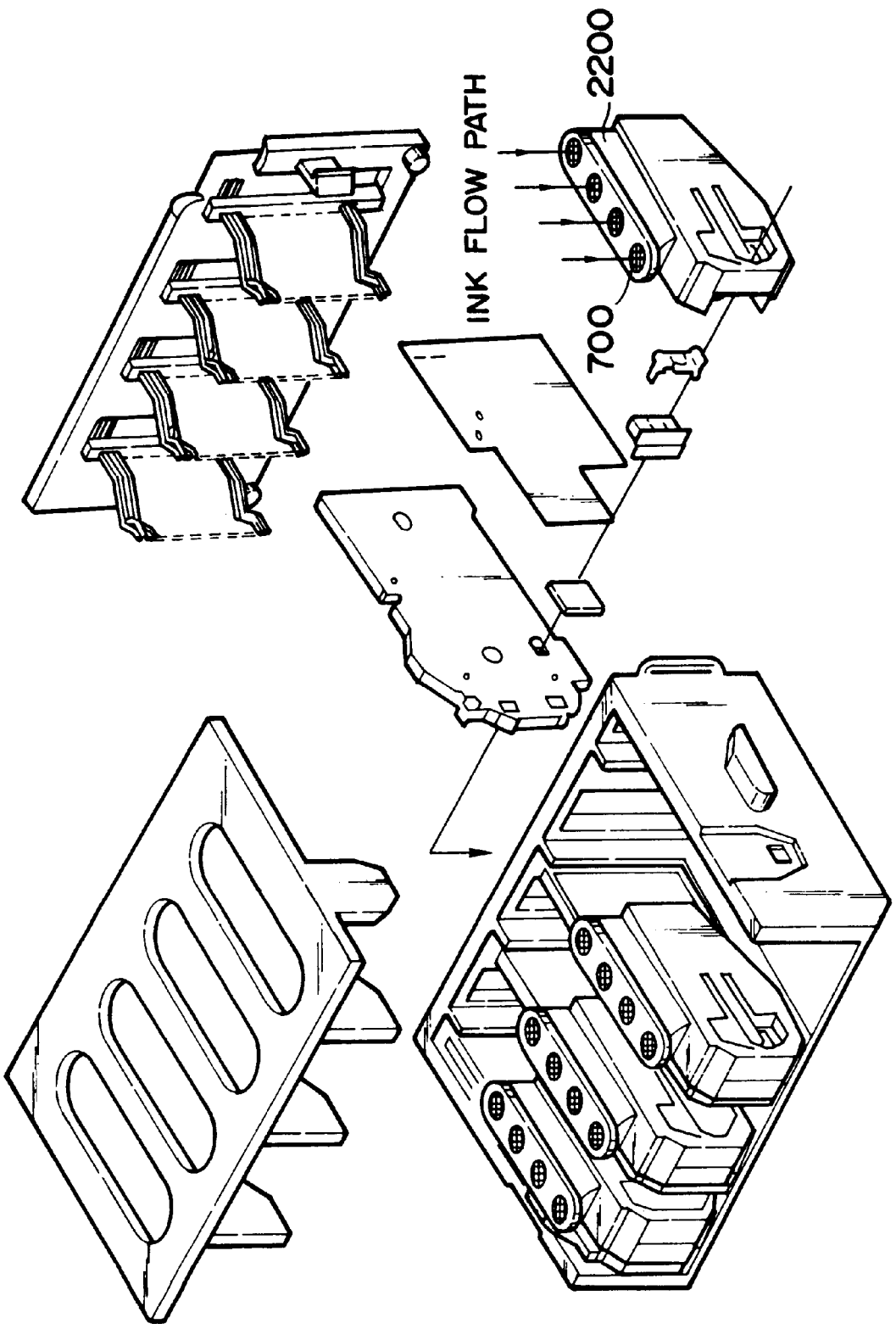
FIG. 21 is a view showing an example of integrating four column heads.

In this manner, different inks can be supplied to each ink discharge orifice by separating a liquid chamber into a plurality of compartments. This figure shows a construction which enables the supply of four color inks, but it is possible to supply more than four color inks by increasing the number of separate liquid chambers. FIG. 21 shows an instance wherein four rows of print heads of this embodiment are arranged. Each color ink is supplied from an ink tank through the ink liquid passageway as shown in the figure to effect printing. The use of such an integral type head unit allows the securer positioning of each print head, easily resulting in higher precision in the longitudinal and horizontal directions.

(Second embodiment)

Figure 3:
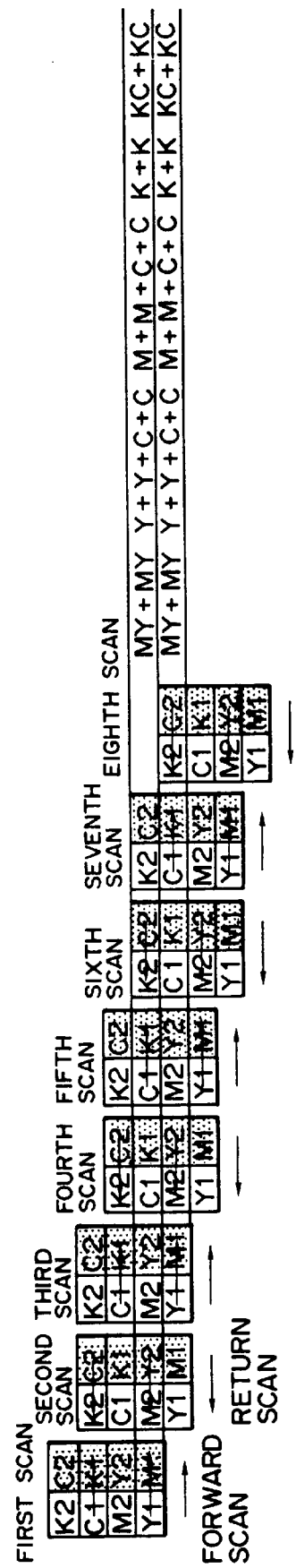
FIG. 3 is a view showing the print head arrangement and a printing method according to the second embodiment.

FIG. 3 shows a second embodiment. This embodiment has a plurality of color-sequential division heads arranged in a main scan direction, with a combination of different color heads arranged in the main scan direction. As shown in the same figure, with this print method, the inks are discharged through the nozzle groups K1, C1, M1, Y1 in the forward scan. In FIG. 3, the order is M1, Y1, and then K1, C1. In the backward scan, the order is M2, Y2, and then K2, C2. When R is formed, for example, M1Y1 is printed at the first scan, the line feed is made, and M2Y2 is printed at the backward scan. After the backward scan that is the second scan, M1Y1 is printed at the third forward scan without any line feed. By repeating the first and second scans as above described, an image is formed. That is, the color-sequential printing for each scan direction is performed. In this manner, the number of discharge nozzles for each scan is halved, as compared with that of the first embodiment, the capacity of a power source of the recording apparatus required for the printing is also halved, resulting in a remarkable effect to reduce the costs. Also, four scans are necessary to form one line of image, resulting in reduced number of scans as compared with the conventional example.

<Color-sequential head longitudinally divided>

Figure 4:
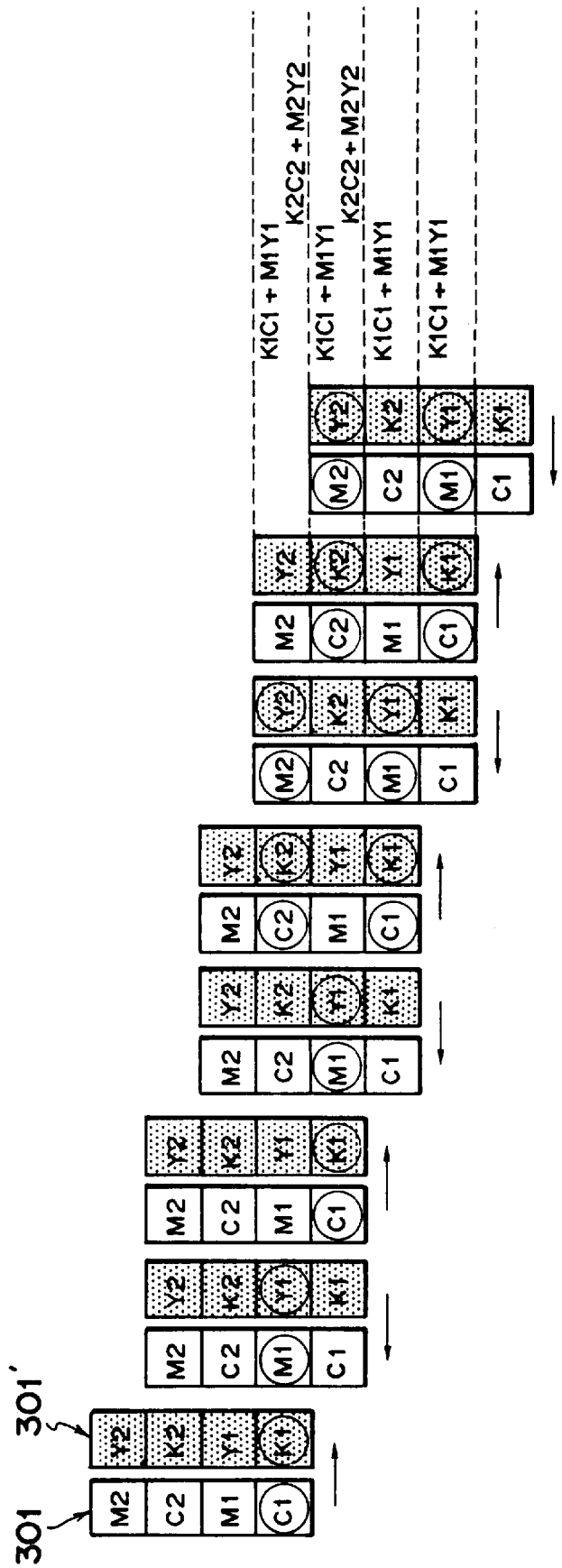
FIG. 4 is a view showing a print head consisting of a row of two heads divided into upper and lower halves.

FIG. 4 shows a variation of color arrangement of the second embodiment. This mode is to divide longitudinal two rows of print heads into upper and lower groups, the former group being dealt as K1C1M1Y1 and the latter group as K2C2M2Y2. In the variation of FIG. 4, K1C1+K2C2 is printed in the forwrad scan, and M1Y1+M2Y2 is printed in the backward scan. The color sequence for one line can be accomplished in a print sequence of K1C1M1Y1+K2C2M2Y2 at any time. An-image of each color is complemented by two scans (such as K1, K2) in this figure. The time from the first shot of ink droplet (K1) to the second shot of ink droplet (K2) amounts to four scans. When a certain amount of ink is jetted onto the recording medium to permeate thereinto jetting the amount of ink droplets by multiple times is more preferable than jetting the same amount of ink at a time, because the ink will spread more easily over the surface of the recording medium, resulting in slight permeation in the sheet thickness direction. Therefore, the reflection density on the surface of the recording medium becomes higher than by one time of jetting.

Figure 5:
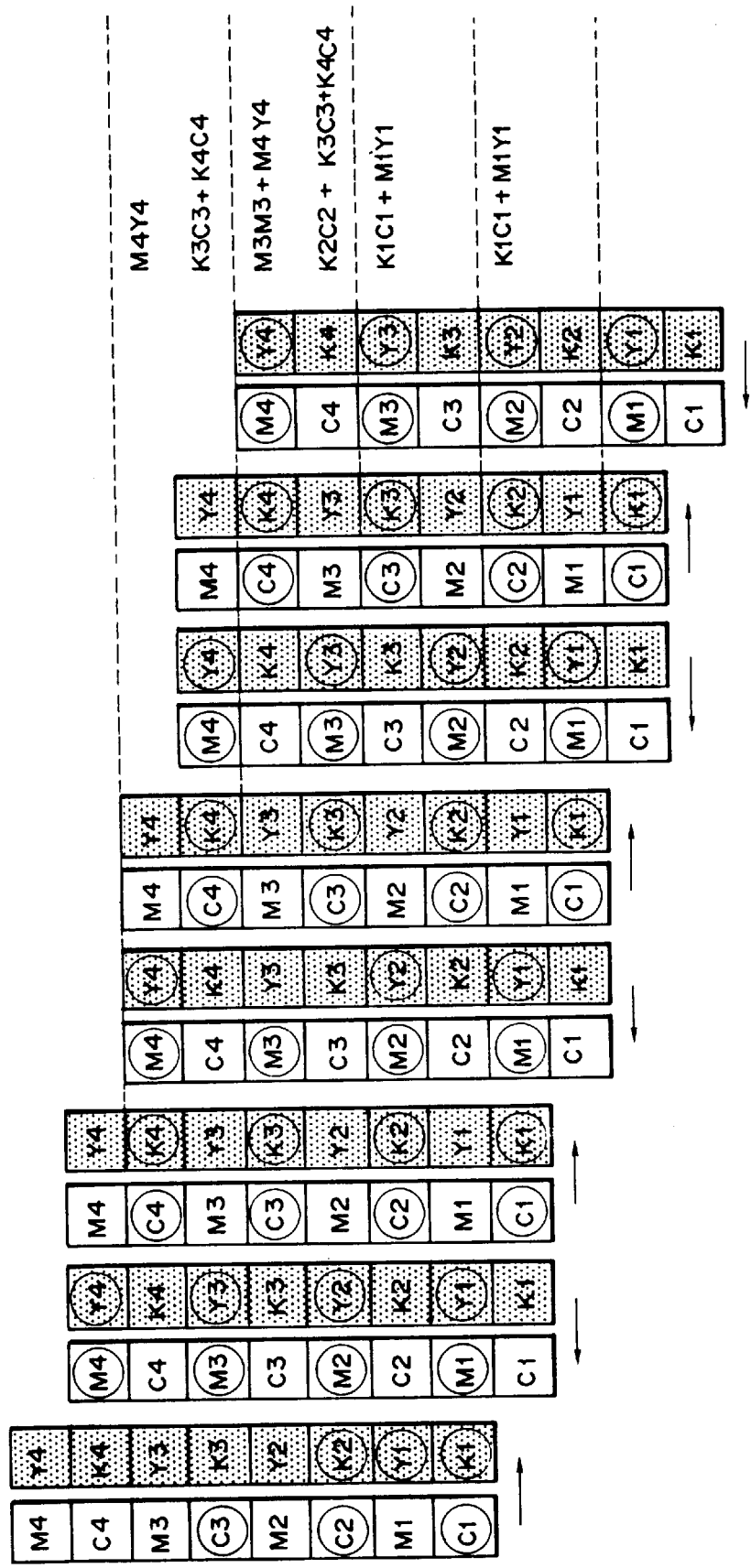
FIG. 5 is a view showing a print head consisting of a row of two heads divided into upper and lower more sections.

Hence, in the fine recording mode, like this embodiment, by providing a sufficient interval between each thinning print, the permeation of the ink into the surface of the recording medium can be effectively promoted to enhance the reflection density thereof, as can be seen if FIGS. 4 and 5. In FIG. 4, the combination of upper and lower two groups of color head has been considered, but now an instance is considered wherein finer divisions in the longitudinal direction are made, with more nozzle groups provided for each color within the print head, and less nozzles provided for each nozzle group (i.e., K1+K2+K3+K4=64 nozzles, instead of K1+K2=64 nozzles, and less nozzles constituting each head such as K1). FIG. 5 corresponds to FIG. 4, and shows the recording heads having the same nozzles as in FIG. 4 divided into more nozzle groups. By dividing one line of image in practice into finer sections, with reduced number of ink droplets shot at a time, the improved density can be attained. Also, by causing ink droplets to be divided and shot, a phenomenon that ink droplets join with each other on the recording medium before permeation to become a granular liquid mass and cause a image degradation can be prevented. In particular, this divided shooting is effective for the recording medium with a longer ink fixing time (such as OHP sheet).

<Color-sequential three row head longitudinally divided>

Figure 6:
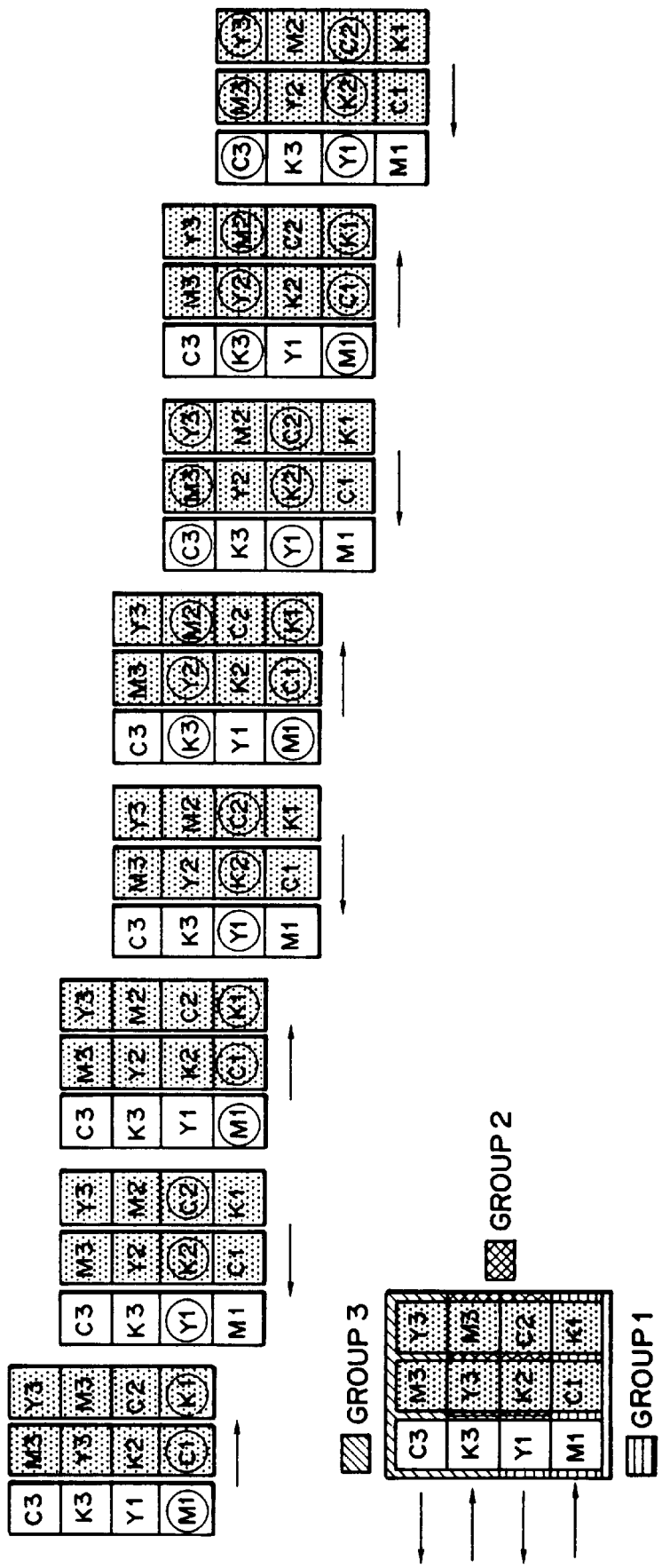
FIG. 6 is a view showing a color-sequential head of three rows divided longitudinally.

An instance will be considered wherein two rows of heads in the second embodiment is extended into three rows. The form of a print head in this embodiment is shown in FIG. 6. In this embodiment, KCMY is divided into three groups, and the color-sequential print is effected with the reciprocative scan, which will be described below in due order.

First scan: K1, C1, M1 of group 1+line feed

Second scan: Y1 of group 1, K2, C2 of group 2

Third scan: K1, C1, M1 of group 1+line feed

Fourth scan: Y1 of group 1, K2, C2 of group 2

Fifth scan: K1, C1, M1 of group 1, M2, Y2 of group 2, K3 of group 3+line feed

Sixth scan: Y1 of group 1, K2, C2 of group 2, C3, M3, Y3 of group 3

Seventh scan: K1, C1, M1 of group 1, M2, Y2 of group 2, K3 of group 3+line feed

Eighth scan: Y1 of group 1, K2, C2 of group 2, C3, M3, Y3 of group 3

Hence, a 100% image can be formed by thinning out to one-third for one color and performing three passes (using each head of three groups). The increased number of heads for use in forming the image, with the shooting of different discharge nozzles, can provide further effects of the fine recording mode as previously described, thus resulting in the improved print quality. Also, in the emphasizing mode, the arbitrary color can be emphasized to 300%.

Figure 7:
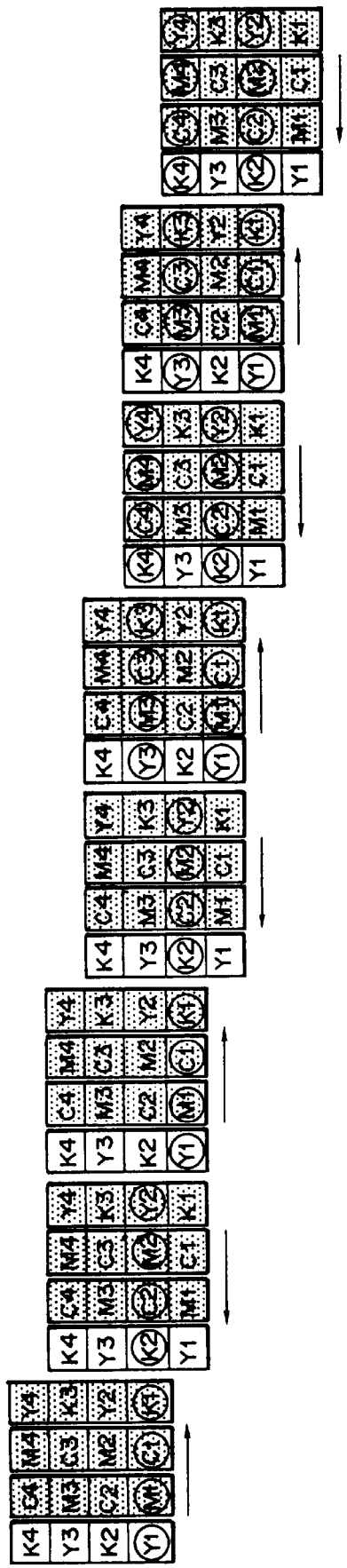
FIG. 7 is a view showing a color-sequential head of four rows divided longitudinally.

Likewise, where the above head rows are changed to four rows of heads, the color sequential image can be also formed, with only one-half the total capacity of power source required for the printing. The instance of four row heads is shown in FIG. 7.

Figure 8:
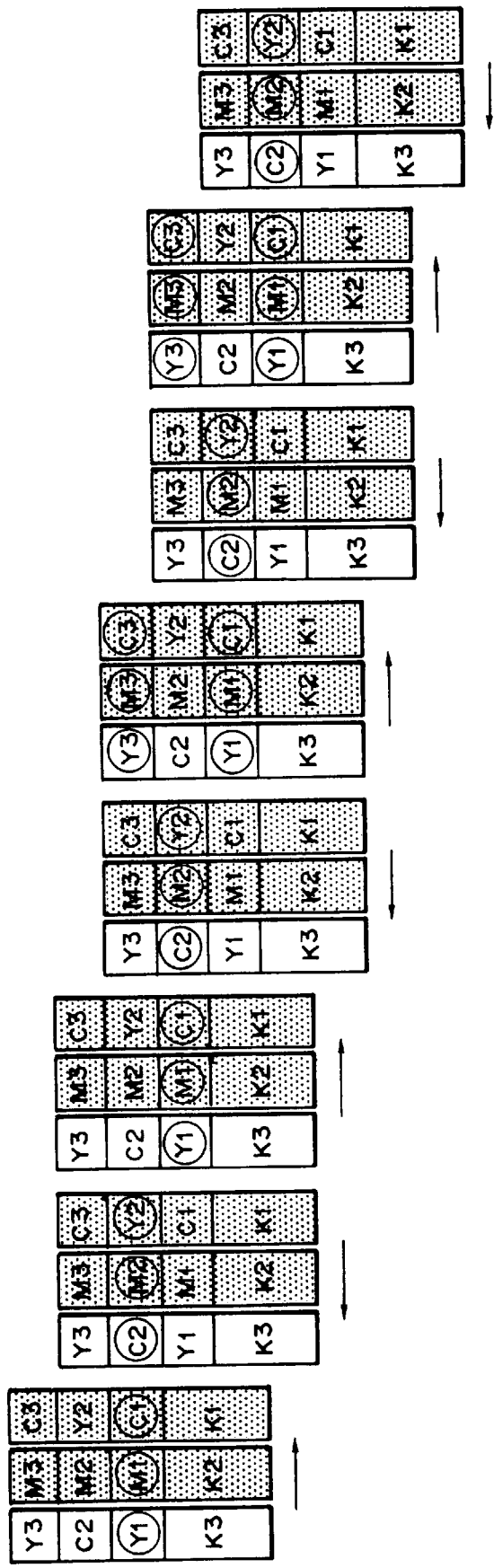
FIG. 8 is a view showing a print head with increased width of head (or number of nozzles) for a specific color.
Figure 9:
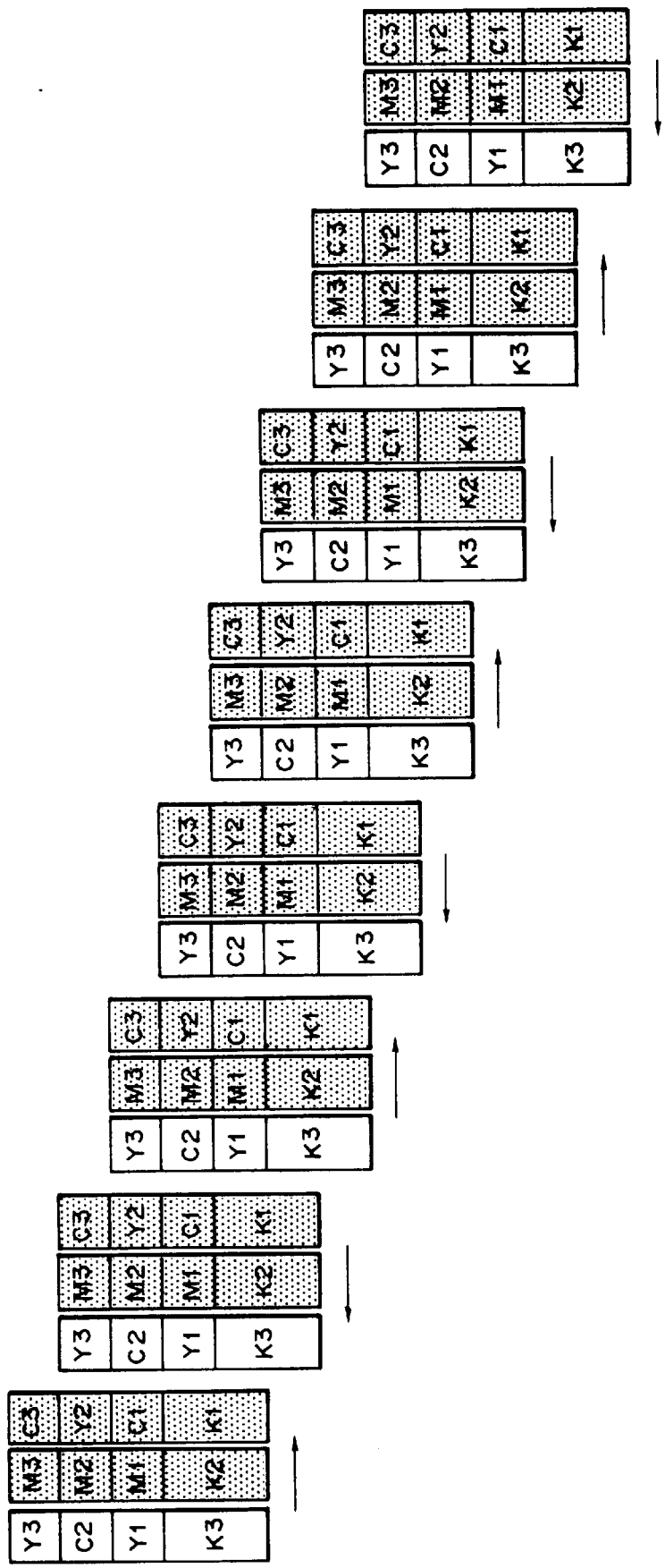
FIG. 9 is a view showing the printing only in the specific color.

An instance of the above three row heads will be considered wherein K head frequently used as character image is made to have more nozzles than other color heads, thereby enhancing the throughput for black character dedicated print mode (hereinafter K mode). In FIG. 8, the number of nozzles for the K head is set to be double that of other heads. When in the K mode, image recording is performed by discharging only the K ink in reciprocative movement, as shown in FIG. 9. Therefore, the high speed printing is allowed while the effects with fine recording mode are provided. Also, the emphasized print can be effected up to 300% at maximum while maintaining the effects with the fine recording mode and the high speed printing. In the case of KCMY printing, the color sequential printing is made for each group in reciprocative movement, like the previous embodiment. However, the K head number is not a head group number. K is not necessary to be dealt as the group, but is printed ahead of the other colors. In this manner, when K head is made larger than the other heads, the effects inherent to the color-sequential head longitudinally divided can be achieved.

(Third embodiment)

Figure 10:
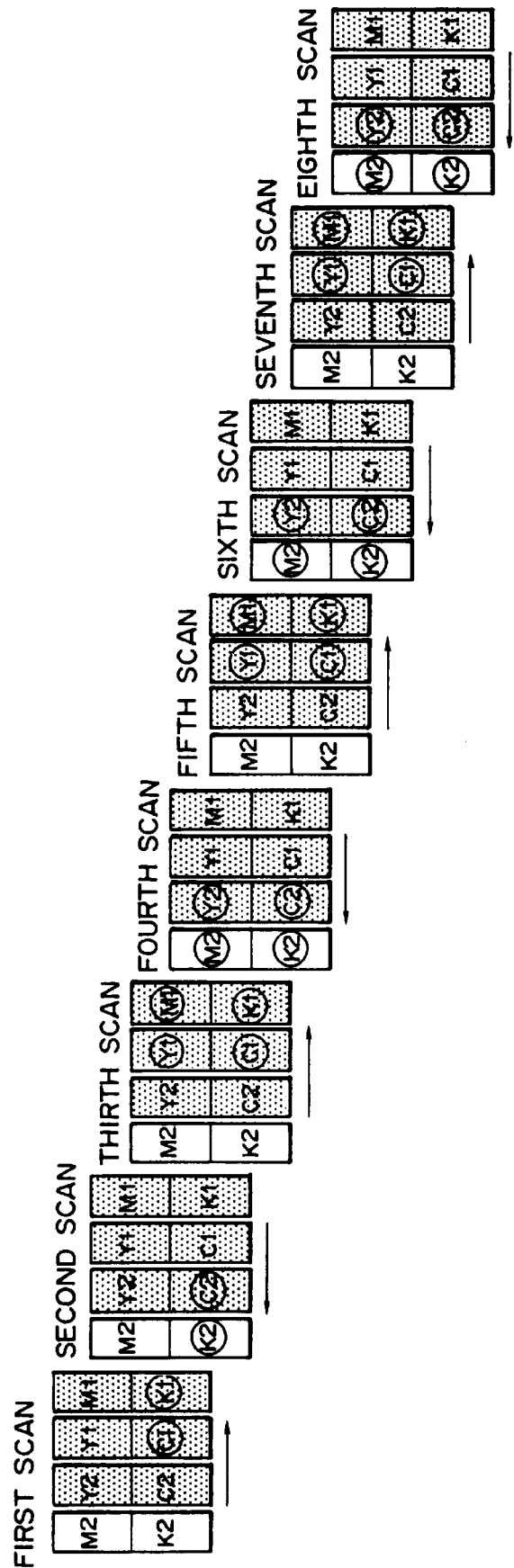
FIG. 10 is a view showing a print head according to the third embodiment.
Figure 11:
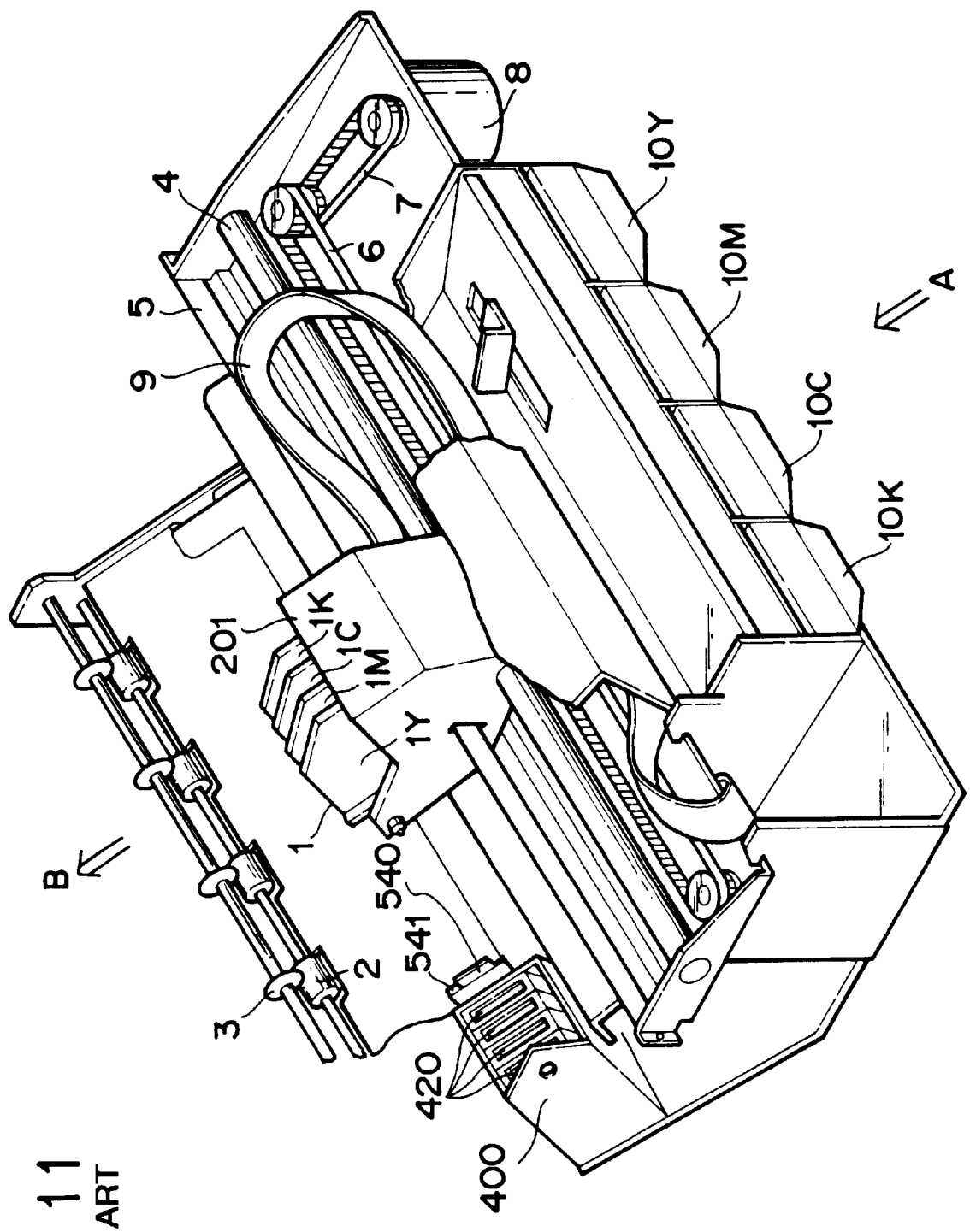
FIG. 11 is a view showing a conventional ink jet printer.
Figure 12C:
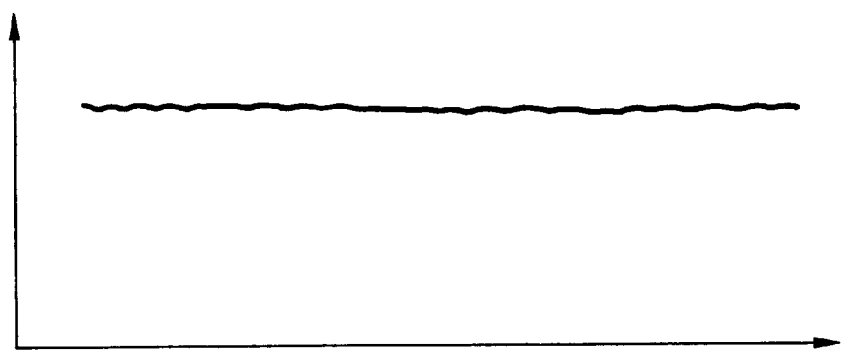
FIGS. 12A to 12C are views showing the fine recording method.
Figure 12B:
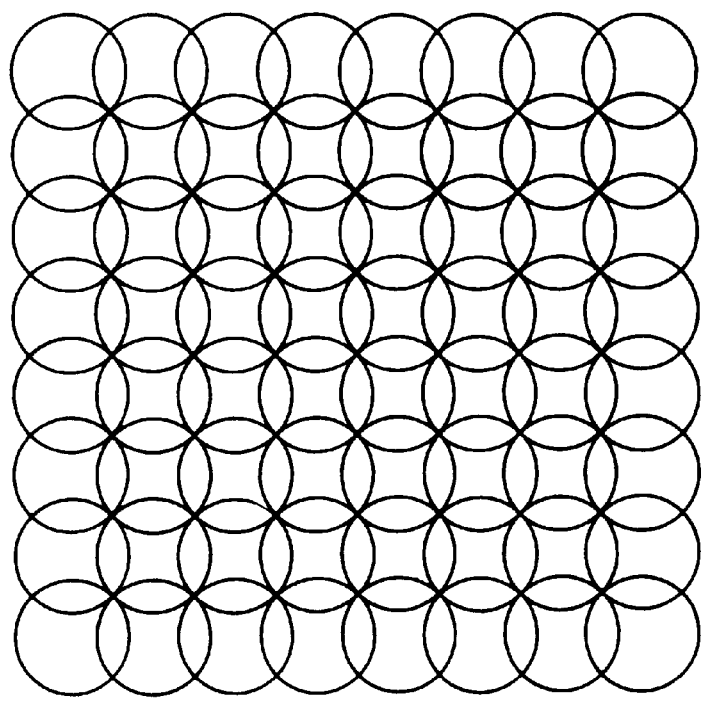
Figure 12A:
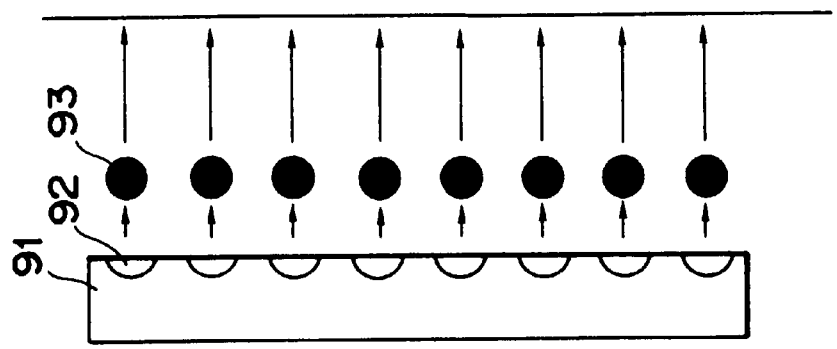
Figure 15A:
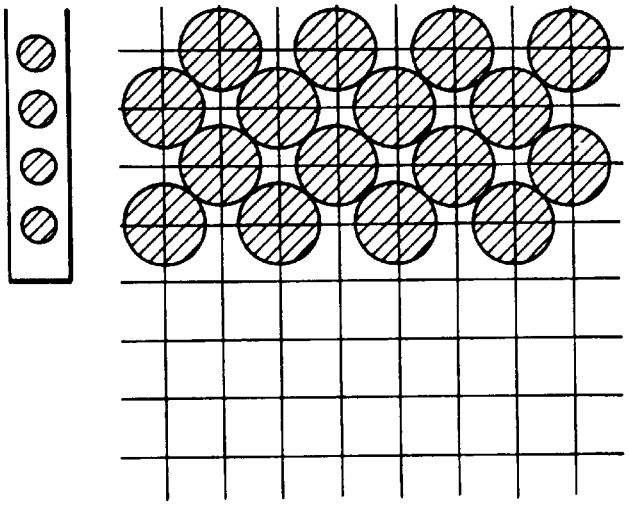
FIGS. 15A to 15C are views showing cross and counter-cross thinning patterns.
Figure 15B:
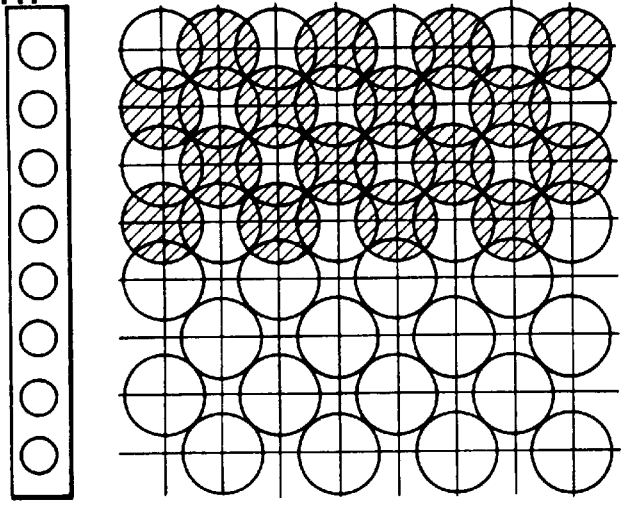
Figure 15C:
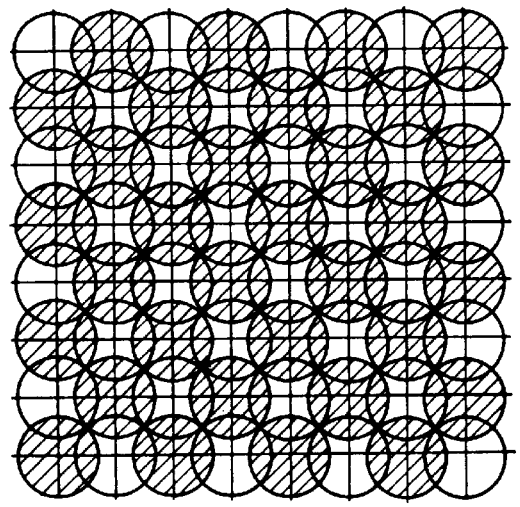
Figure 16:
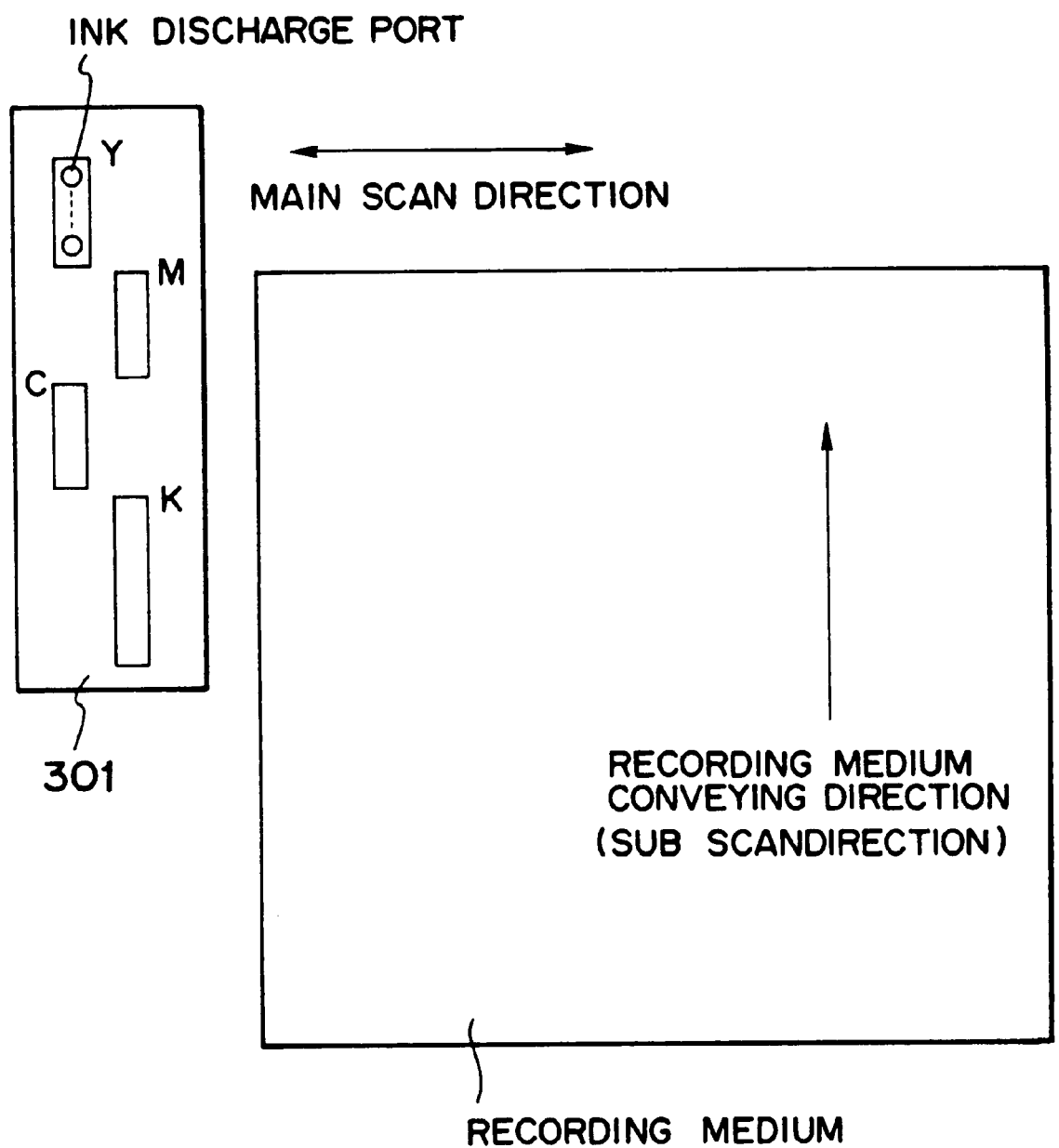
FIG. 16 is a view showing the arrangement of a conventional print head.
Figure 17:
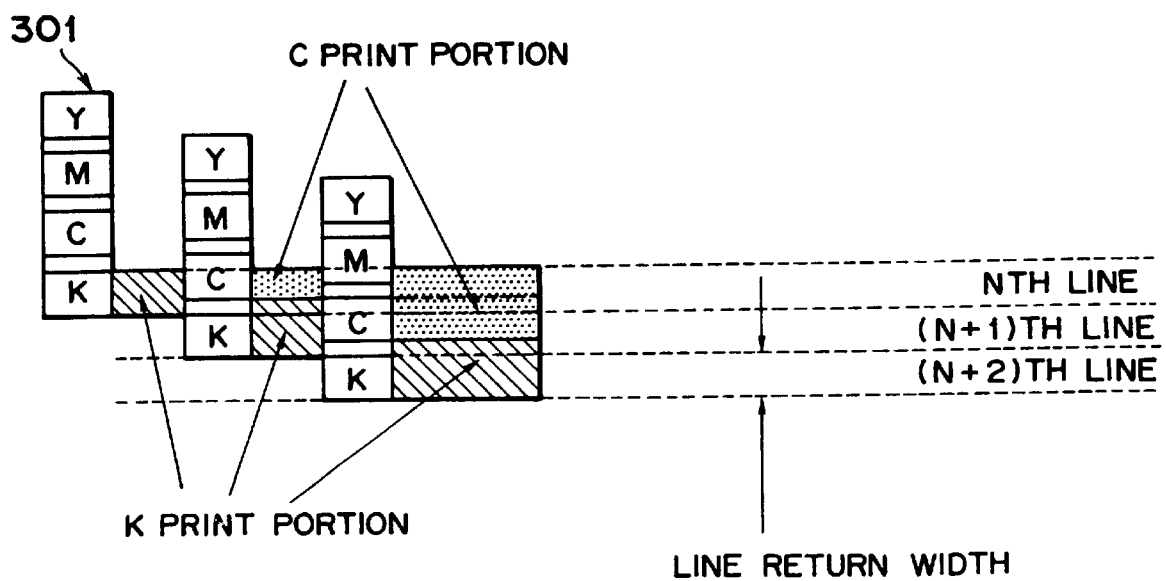
FIG. 17 is a view showing a conventional color-sequential printing.
Figure 18:
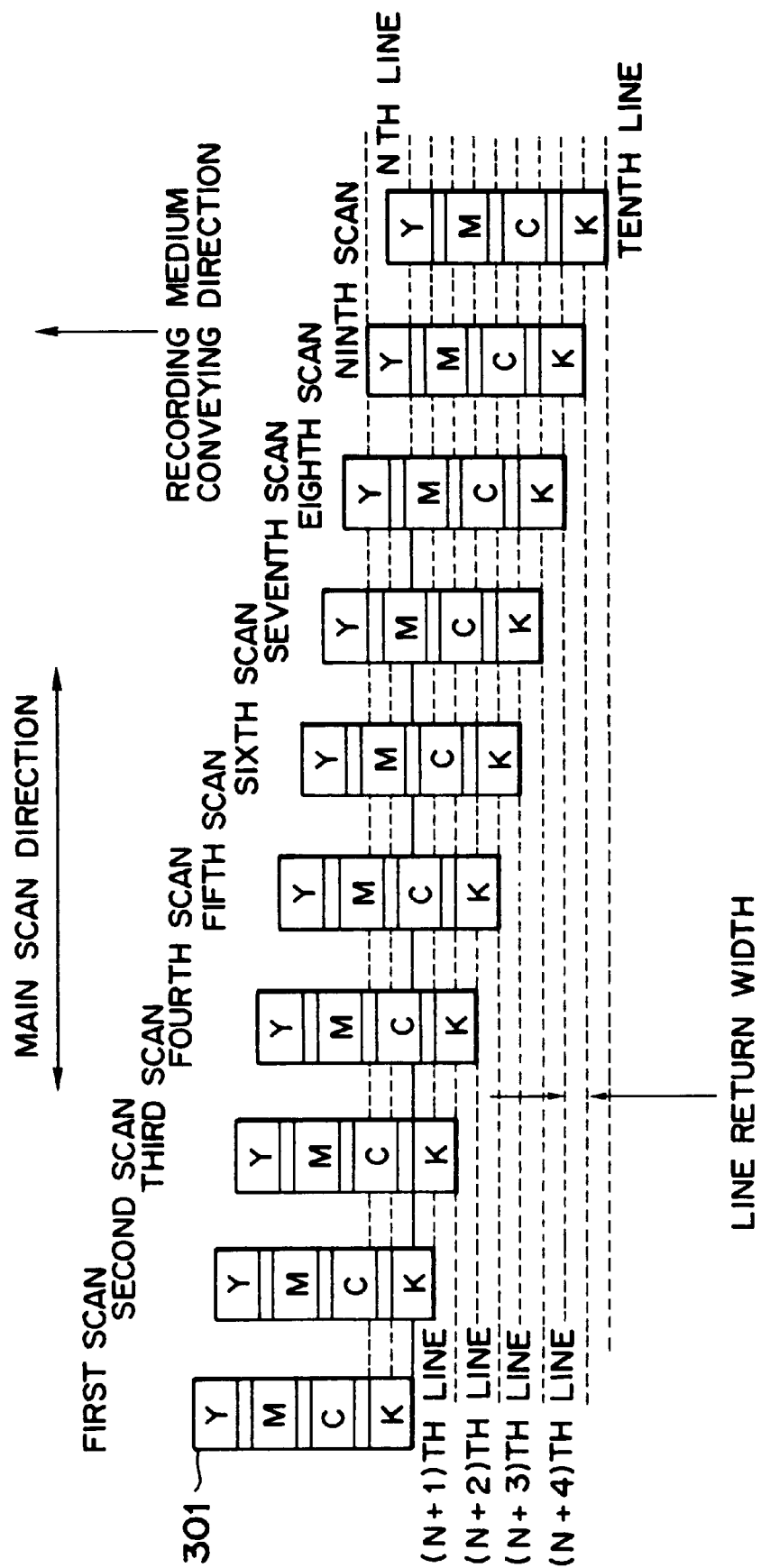
FIG. 18 is a view showing the fine recording method with a conventional color-sequential head.

A third embodiment is shown in FIG. 10. This embodiment is a combination of a printer having a head identical to previously used one divided inside by different color inks with the fine recording method as described in the conventional example. Each print scan is performed in a width of line feed shorter than the width of head print which is a feature of the fine recording method. FIG. 10 shows the setting of one-quarter the width of one head (one-half the width of head such as K1 in the same figure). First, in the first scan (forward scan), shown at the left end in the same figure, the printing is performed using the lower half of K1, C1 as surrounded by the circle. In the subsequent second scan (backward scan), the printing is performed using the total width of K2, C2 as surrounded by the circle. Then, in the third scan (forward scan), the printing is performed using the total width of K1, C1 as surrounded by the circle and the lower half of M1, Y1. And in the fourth scan (backward scan), the printing is performed using the total width of K2, C2, M2, Y2 as surrounded by the circle. In this manner, after data of K, C is printed, data of M, Y is printed, whereby the shoot order onto the recording medium is KCMY at all times, so that an excellent image can be obtained at higher speed without occurrence of color shade in the reciprocative printing.

Also, a very high quality image can be printed without degradation of image such as mixed colors or tie streaks due to feed error of the sheet feed system or percolating ink which may result from the effects of the fine recording method.

It should be noted that the present invention is not limited to the reciprocative scan printing, but may be realized in the one-way scan printing. In this case, the arrangement of nozzle groups for each color is not subjected to any limitations as imposed on the reciprocative scan printing.

As described above, with the present invention, the recording is performed using a recording head having a plurality of discharge orifice groups in a main scan direction, each of which has a plurality of discharge orifices for discharging the inks of different colors which are provided in a direction different from the main scan direction, resulting in a higher quality image, with less print unevenness, owing to the color-sequential printing and the fine recording method, at higher speed with the reciprocative printing.

The present invention brings about excellent effects particularly in a recording device of the ink jet system for recording by forming fine ink droplets by the use of heat energy among the various ink jet recording systems.

As to its representative constitution and principle, for example, one practiced by use of the basic principle disclosed in, for example, U.S. Pat. Nos. 4,723,129 and 4,740,796 is preferred. This system is applicable to either of the so-called on-demand type and the continuous type. Particularly, the case of the on-demand type is effective because, by applying at least one driving signal which gives rapid temperature elevation exceeding nucleus boiling corresponding to the recording information on electricity-heat converters arranged corresponding to the sheets or liquid channels holding a liquid (ink), heat energy is generated at the electricity-heat converters to effect film boiling at the heat acting surface of the recording head, and consequently the bubbles within the liquid (ink) can be formed corresponding one by one to the driving signals. By discharging the liquid (ink) through an opening for discharging by growth and shrinkage of the bubble, at least one droplet is formed. By making the driving signals into the pulse shapes, growth and shrinkage of the bubbles can be effected instantly and adequately to accomplish more preferably discharging of the liquid (ink) particularly excellent in response characteristic.

As the driving signals of such pulse shape, those as disclosed in U.S. Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination of the discharging orifice, liquid channel, and electricity-heat converter (linear liquid channel or right-angled liquid channel) as disclosed in the above-mentioned respective specifications, the constitution by use of U.S. Pat. Nos. 4,558,333 or 4,459,600 disclosing the constitution having the heat acting portion arranged in the flexed region is also included in the present invention.

In addition, the present invention can be also effectively made the constitution as disclosed in Japanese Patent Application Laid-Open No. 59-123670 which discloses the constitution using a slit common to a plurality of electricity-heat converters as the discharging portion of the electricity-heat converter or Japanese Patent Application Laid-Open No. 59-138461 which discloses the constitution having the opening for absorbing pressure wave of heat energy correspondent to the discharging portion.

In addition, the present invention is effective for a recording head of the freely exchangeable chip type which enables electrical connection to the main device or supply of ink from the main device by being mounted on the main device, or a recording head of the cartridge type having an ink tank integrally provided on the recording head itself.

Also, addition of a restoration means for the recording head, a preliminary auxiliary means, etc., provided as the constitution of the recording device of the present invention is preferable, because the effect of the present invention can be further stabilized. Specific examples of these may include, for the recording head, capping means, cleaning means, pressurization or suction means, electricity-heat converters or another type of heating elements, or preliminary heating means according to a combination of these, and it is also effective for performing stable recording to perform preliminary mode which performs discharging separate from recording.

In addition, though the ink is considered as the liquid in the embodiments as above described, another ink may be also usable which is solid below room temperature and will soften or liquefy at or above room temperature, or liquefy when a recording signal is issued as it is common with the ink jet device to control the viscosity of ink to be maintained within a certain range of the stable discharge by adjusting the temperature of ink in a range from 30° C. to 70° C.

In addition, in order to avoid the temperature elevation due to heat energy by positively utilizing the heat energy as the energy for the change of state from solid to liquid, or to prevent the evaporation of ink by using the ink which will stiffen in the shelf state, the use of the ink having a property of liquefying only with the application of heat energy, such as liquefying with the application of heat energy in-accordance with a recording signal so that liquid ink is discharged, or is already solidifying upon reaching the recording medium, is also applicable in the present invention. In such a case, the ink may be held as liquid or solid in recesses or through holes of a porous sheet, which is placed opposed to electricity-heat converters, as described in Japanese Patent Application Laid-Open No. 54-56847 or No. 60-71260. The most effective method for the ink as above described in the present invention is based on the film boiling.

Further, a recording apparatus according to the present invention may be used in the form of an image output terminal for the information processing equipment such as a word processor or a computer, integrally or separately provided, a copying machine in combination with a reader, or a facsimile apparatus having the transmission and reception features.

Figure 22:
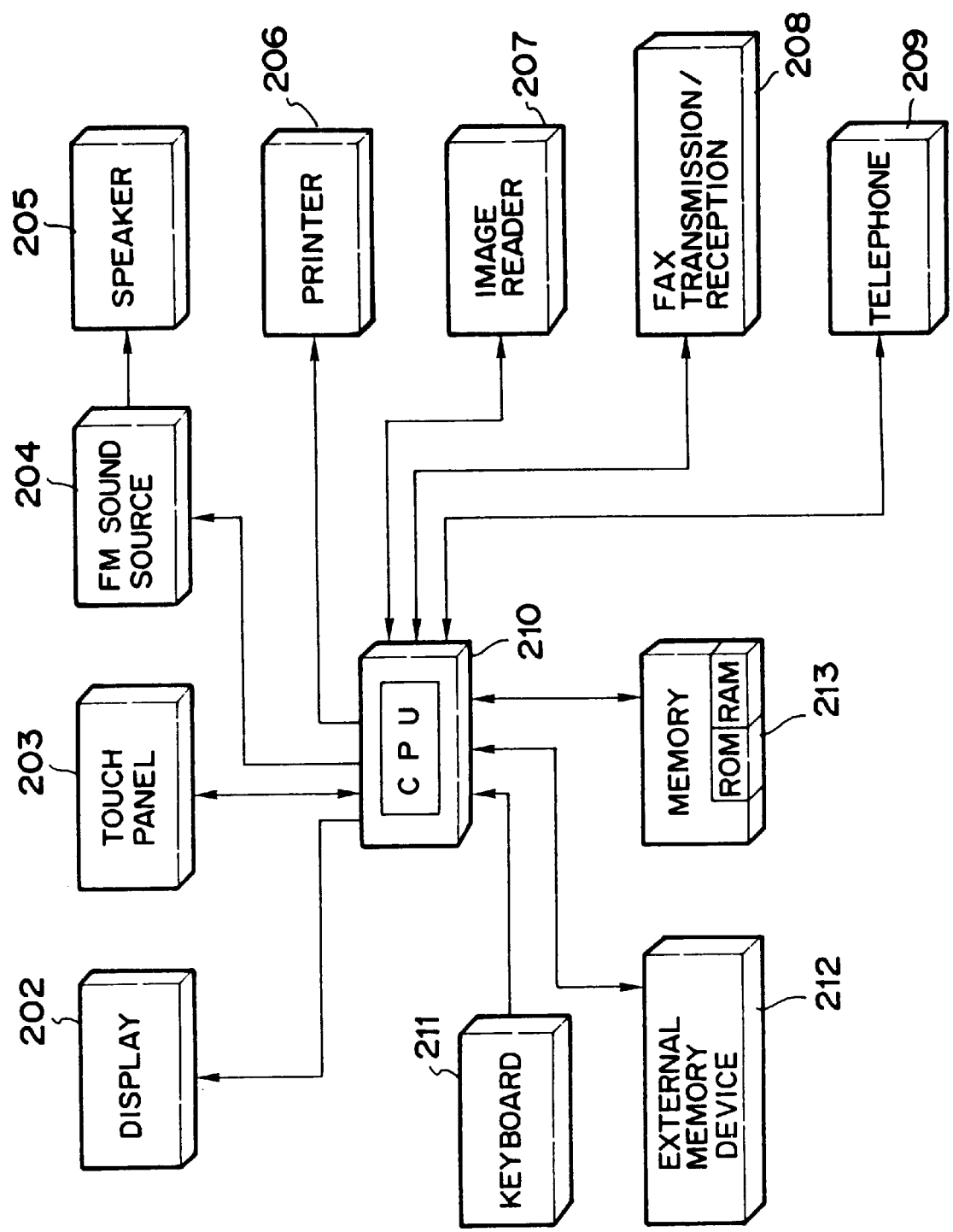
FIG. 22 is a block diagram showing a schematic configuration wherein an ink jet recording apparatus of the present invention is applied to an information processing equipment.

FIG. 22 is a block diagram, showing structures corresponding to an image data supply means, and showing a schematic configuration in which a recording apparatus of the present invention is applied to the information processing apparatus having the features of word processor, personal computer, facsimile apparatus, and copying machine. In the figure, 210 is a control unit for controlling the whole apparatus, comprised of a CPU such as a microprocessor or various I/O ports, this control unit controlling each unit by sending or receiving control or data signals to or from it. 202 is a display unit for displaying various menus, document information, and image data read with an image reader 207 on its display screen. 203 is a transparent, pressure sensitive touch panel provided on the display unit 202, which enables the entry of items or coordinate values on the display unit 202 by depressing its surface with a finger or the like.

204 is an FM (Frequency Modulation) sound source unit, which makes the FM modulation for the music information created with a music editor, this information being stored in a memory 210 or an external storage device 212 as the digital data and read therefrom. An electrical signal from the FM sound source 204 is converted into an audible sound by a speaker unit 205. A printer unit 206 consists of a recording apparatus according to the present invention as the output terminal for a word processor, a personal computer, a facsimile apparatus, or a copying machine.

207 is an image reader unit for photoelectrically reading original data to be input, which is provided midway on original conveying passage to read facsimile or copying original, and other various kinds of originals. 208 is a FAX transmission or reception unit for FAX transmitting original data read by the image reader unit 207 or receiving and decoding facsimile signals transmitted thereto, this unit having an interface facility with the outside. 209 is a telephone unit, comprising various telephone functions, such as an ordinary telephone function or an automatic answering telephone function. 213 is a memory unit comprised of a ROM for storing a system program, manager programs and other application programs, character fonts, and dictionaries, a RAM for storing application programs or document information loaded from the external storage device 212, and a video RAM.

211 is a keyboard unit useful for inputting document information or various kinds of command. 212 is an external storage device, which is a storage medium consisting of a floppy disk or a hard disk, for the storage of document information, music or audio data, and user's application programs.

Figure 23:
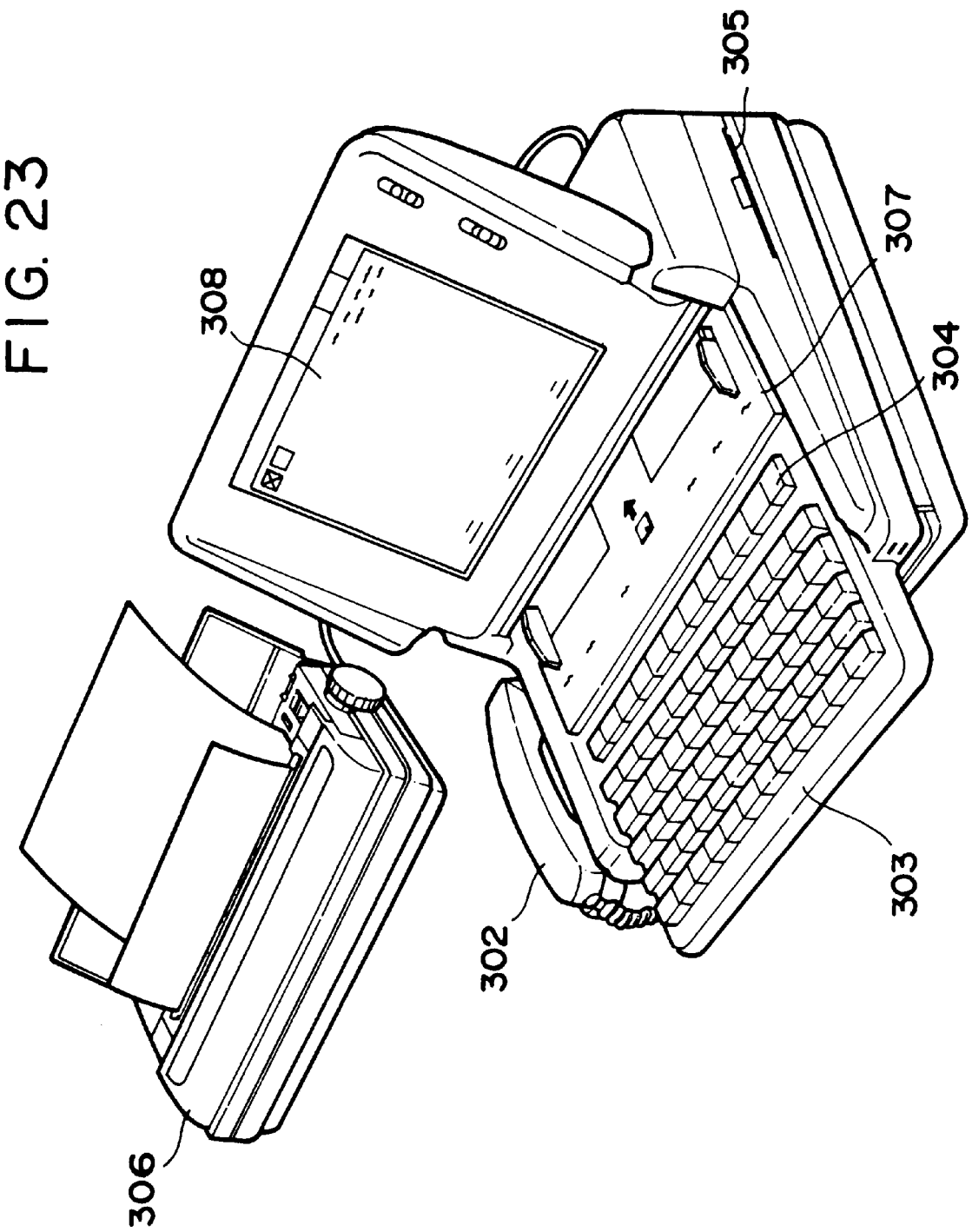
FIG. 23 is an external view of the information processing equipment as shown in FIG. 22.

FIG. 23 is a typical appearance view of the information processing apparatus as shown in FIG. 22. In the figure, 308 is a flat panel display utilizing liquid crystal or the like for displaying various menus, graphic data or documents. On this display 308 is installed the touch panel, which enables the entry of coordinates or item specifications by depressing the surface of the touch panel with a finger or the like. 302 is a handset for use when the apparatus functions as a telephone.

A keyboard 303 is detachably connected via a cord to the main body, and is used to input various documents or data. Also, the keyboard 303 is provided with various function keys 304. 305 is an opening for insertion of the floppy disk.

307 is a sheet feed board for placing thereon papers to be read by the image reader unit 207, the read paper being exhausted out of the rear side of device. In the facsimile reception, received data is recorded by an ink jet printer 307.

Figure 24:
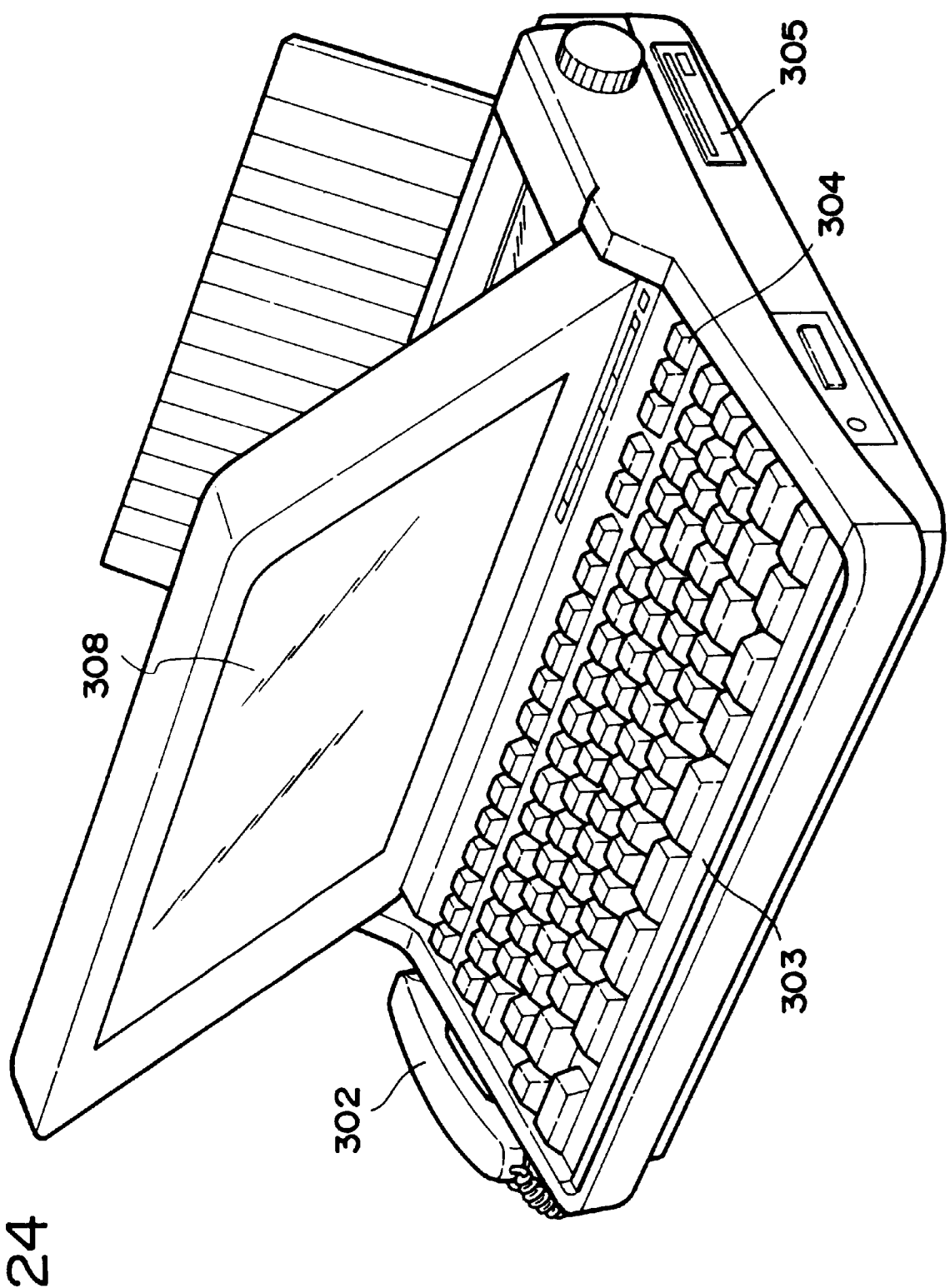
FIG. 24 is an external view of the information processing equipment with an ink jet printer contained.

It should be noted that the display unit 308 as above described may be a CRT, but is preferably a flat panel of the liquid crystal display using a ferroelectric liquid crystal, because it can be more compact, in addition to be thinner and lighter. When the above-noted information processing device functions as a word processor, various document information input form the keyboard 211 are processed according to a document processing program by the control unit 210 as shown in FIG. 22, and output as the image to the printer 206. When such information processing device functions as a personal computer, various kinds of data input from the keyboard 211 is calculated in accordance with an application program by the control unit 201, with its calculated result output as the image to the printer unit 206. When it functions as a receiver for the facsimile apparatus, facsimile information input from the FAX transmission/reception unit 208 via the communication line are received according to a predetermined program by the control unit 210, and output to the printer unit 206 as the received image. And when it functions as a copying machine, an original is read by the image reader unit 207, and read original data is output via the control unit 210 to the printer unit 206 as the copied image. Note that it functions as a transmitter for the facsimile apparatus, original data read by the image reader unit 207 is processed for transmission according to a predetermined program by the control unit 210, and transmitted via the FAX transmission/reception unit 208 to the communication line. It should be noted that the above-noted information processing device can be an integral type incorporating an ink jet printer within the main body, as shown in FIG. 24, in which its portability can be enhanced. In the same figure, like reference numerals are affixed to parts having the same functions as those in FIG. 23.

If a recording apparatus of the present invention is applied to the multifunctional type information processing device as above described, higher quality recording image can be obtained so that the functions of the information processing device can be further enhanced.

What is claimed is:

1. An ink jet recording apparatus for recording on a recording medium in a plurality of colors, comprising:

a plurality of ink jet recording heads provided along a main scan direction, each of said plurality of ink jet heads recording on the recording medium by discharging ink through a discharge port and having a plurality of discharge port groups having a plurality of discharge ports arranged along a direction different from said main scan direction, said plurality of discharge port groups of a predetermined said recording head corresponding to the plurality of colors and also said plurality of discharge port groups corresponding to ink of a same said color being arranged on said plurality of ink jet recording heads;

scanning means for reciprocally scanning said plurality of ink jet recording heads relatively along said main scan direction; and recording control means for controlling both scanning of said plurality of ink jet recording heads by said scanning means relative to the recording medium and recording using said ink jet recording heads by discharging ink through said discharge ports, wherein, with respect to each of said colors, a position where said discharge port group of a same color is provided in each of said recording heads is different along the arranging direction of said discharge ports and said recording control means forms an image corresponding to each of said colors by said plurality of discharge sort groups provided in said plurality of recording heads.

2. An ink jet recording apparatus according to claim 1, characterized by further comprising image data supply means for dividing a predetermined image data into pieces of thinned image data in complementary relation to each other and supplying said pieces of thinned image data to respective different discharge ports groups, which are caused to record said predetermined image data.

3. An ink jet recording apparatus according to claim 1, wherein each of said ink jet recording heads comprise a plurality of electricity-heat converters for generating a thermal energy discharge the ink.

4. An ink jet recording apparatus according to claim 3, wherein each of said ink jet recording heads cause a state change in the ink as a consequence of the thermal energy generated by said electricity-heat converters, and discharges the ink through said discharge ports due to said state change.

5. An ink jet recording apparatus according to claim 1, further comprising receiving means for receiving an image information.

6. An ink jet recording apparatus according to claim 1, further comprising transmitting means for transmitting an image information to an image recording apparatus connected through a signal line.

7. An ink jet recording apparatus according to claim 6, further comprising an original image reading means for reading an original image.

8. An ink jet recording apparatus according to claim 1, further comprising an original image reading means for reading an original image.

9. An ink jet recording apparatus according to claim 1, further comprising a recording signal input means for inputting a recording signal.

10. An ink jet recording apparatus according to claim 9, characterized in that said recording signal input means is a keyboard.

11. An ink jet recording apparatus according to claim 1, wherein the plurality of discharge port groups of the predetermined ink jet recording head correspond to the plurality of colors, respectively.

12. An ink jet recording apparatus according to claim 1, wherein the plurality of discharge port groups of the predetermined ink jet recording head are divided into a the plurality of discharge port groups corresponding to each of the plurality of colors.

13. An ink jet recording apparatus according to claim 1, wherein said recording means records an image area corresponding to a plurality of discharge ports constituting one discharge port group by a plurality of discharge port groups corresponding to a same color complementarily with each other.

14. An information processing apparatus comprising:
an ink jet recording apparatus for recording on a recording medium in a plurality of colors, comprising:
a plurality of ink jet recording heads provided along a main scan directions each of said plurality of ink jet heads recording on the recording medium by discharging ink through a discharge port and having a plurality of discharge port groups having a plurality of discharge ports arranged along a direction different from said main scan direction, said plurality of discharge port groups of a predetermined said recording head corresponding to the plurality of colors and also said plurality of discharge port groups corresponding to ink of a same said color being arranged on said plurality of ink jet recording heads;
scanning means for reciprocally scanning said plurality of ink jet recording heads relatively along said main scan direction;
recording control means for controlling scanning of said plurality of ink jet recording heads by said scanning means relative to the recording medium to record by discharging ink through said discharge ports; and
computation means for performing a computation involved in recording,
wherein, with respect to each of said colors, a position where said discharge port group of a same color is provided in each of said recording heads is different along the arranging direction of said discharge ports and said recording control means forms an image corresponding to each of said colors by said plurality of discharge port groups provided in said plurality of recording heads.

15. An information processing apparatus according to claim 14, wherein the plurality of discharge port groups of the predetermined ink jet recording head correspond to the plurality of colors, respectively.

16. An information processing apparatus according to claim 14, wherein the plurality of discharge port groups of the predetermined ink jet recording head are divided into a the plurality of discharge port groups corresponding to each of the plurality of colors.

17. A plurality of ink jet recording heads for use with an ink jet recording apparatus which records on a recording medium in a plurality of colors while moving said recording head in a main scan direction, wherein said plurality of ink jet recording heads are provided along a main scan direction, and wherein each of said ink jet recording heads having a plurality of discharge port groups having a plurality of discharge ports arranged along a direction different from the main scan direction, wherein, with respect to each of said colors, a position where said discharge port group of a same said color is provided in each of said recording heads is different along the arranging direction of said discharge ports and said plurality of discharge port groups of a predetermined said recording head corresponding to the plurality of colors and also said plurality of discharge port groups corresponding to ink of a same said color being arranged on said plurality of ink jet recording heads and wherein said recording head discharges an ink onto the recording medium to effect recording in response to an applied image signal, and when said head is mounted in the ink jet recording apparatus, said recording head has a unit of said discharge ports comprising said plurality of discharge port groups which are disposed in said main scan direction.

18. A plurality of ink jet recording heads according to claim 17, wherein the plurality of discharge port groups of the predetermined ink jet recording head correspond to the plurality of colors, respectively.

19. A plurality of ink jet recording heads according to claim 17, wherein the plurality of discharge port groups of the predetermined ink jet recording head are divided into a the plurality of discharge port groups corresponding to each of the plurality of colors.

20. An ink jet recording method comprising:
providing a plurality of ink jet recording heads for use with an ink jet recording apparatus which records on a recording medium in a plurality of colors while moving said recording heads in a main scan directions said recording heads discharging an ink onto the recording medium to effect recording, and when said heads are mounted in said ink jet recording apparatus, each of said plurality of ink jet recording heads having a plurality of discharge port groups having a plurality of discharge ports arranged along a direction different from the main scan direction, wherein, with respect to each of said colors, a position where said discharge port group of a same said color is provided in each of said recording heads is different along the arranging direction of said discharge sorts and said plurality of discharge port groups of a predetermined said recording head corresponding to the plurality of colors and also said plurality of discharge port groups corresponding to ink of a same said color being arranged on said plurality of ink jet recording heads;
mounting said ink jet recording head on said ink jet recording apparatus; and
recording in response to an applied image signal by discharging ink through said discharge ports by scanning said plurality of ink jet recording heads by said scanning means relative to the recording medium, said recording forming an image corresponding to each of said colors by said plurality of discharge port groups provided in said plurality of recording heads.

21. An ink jet recording method according to claim 20, wherein the plurality of discharge port groups of the predetermined ink jet recording head correspond to the plurality of colors, respectively.

22. An ink jet recording method according to claim 20, wherein the plurality of discharge port groups of the predetermined ink jet recording head are divided into a the plurality of discharge port groups corresponding to each of the plurality of colors.

* * * * *

UNITED STATES PATENT AND TRADEMARK OFFICE
CERTIFICATE OF CORRECTION

PATENT NO.    : 6,033,055
DATED         : March 7, 2000
INVENTOR(S)   : Shigeyasu Nagoshi, et al.

It is certified that error appears in the above-identified patent and that said Letters Patent is hereby corrected as shown below:

Title page,
Item [56] References Cited, under FOREIGN PATENT DOCUMENTS "531922" should read -- 5-31922 --.

Column 3:
Line 48, "all" should read -- of all --; and
Line 50, "all" should read -- of all --.

Column 5:
Line 58, "more" should be deleted.

Column 6:
Line 41, "add" should read -- odd --.

Column 8:
Line 7, "a" should read -- an --; and
Line 27, "sealant 120," should read -- sealant, --.

Column 9,
Line 28, "if" should read -- in --.

Column 14:
Line 38, "sort" should read -- port --;
Line 50, "energy" should read -- energy to -- ;
Line 57, close up right margin; and
Line 60, close up right margin.

UNITED STATES PATENT AND TRADEMARK OFFICE
CERTIFICATE OF CORRECTION

PATENT NO.   : 6,033,055
DATED        : March 7, 2000
INVENTOR(S)  : Shigeyasu Nagoshi, et al.

It is certified that error appears in the above-identified patent and that said Letters Patent is hereby corrected as shown below:

Column 15:
Line 1, close up right margin;
Line 4, close up right margin;
Line 15, "the" should be deleted;
Line 27, "directions" should read -- direction, --; and
Line 64, "the" should be deleted.

Column 16:
Line 26, "the" should be deleted;
Line 32, "directions" should read -- direction, -- ;
Line 43, "sorts" should read -- ports --; and
Line 63, "the" should be deleted.

Signed and Sealed this

Twenty-fifth Day of September, 2001

Attest:

*Nicholas P. Godici*

NICHOLAS P. GODICI
*Attesting Officer*    *Acting Director of the United States Patent and Trademark Office*